(12) United States Patent
Tsunetomo et al.

(10) Patent No.: US 12,174,399 B2
(45) Date of Patent: Dec. 24, 2024

(54) OPTICAL COMPONENT AND METHOD OF MANUFACTURING OPTICAL COMPONENT

(71) Applicant: Nippon Sheet Glass Company, Limited, Tokyo (JP)

(72) Inventors: Keiji Tsunetomo, Sagamihara (JP); Shiro Sato, Sagamihara (JP); Satoru Kusaka, Sagamihara (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 777 days.

(21) Appl. No.: 16/514,168

(22) Filed: Jul. 17, 2019

(65) Prior Publication Data
US 2019/0339423 A1 Nov. 7, 2019

Related U.S. Application Data

(63) Continuation of application No. PCT/JP2017/042597, filed on Nov. 28, 2017.

(30) Foreign Application Priority Data

Jan. 18, 2017 (JP) .................................. 2017-006677

(51) Int. Cl.
*G02B 3/04* (2006.01)
*B29D 11/00* (2006.01)
*G02B 3/00* (2006.01)

(52) U.S. Cl.
CPC .......... *G02B 3/04* (2013.01); *B29D 11/00298* (2013.01); *B29D 11/00442* (2013.01); *G02B 3/005* (2013.01)

(58) Field of Classification Search
CPC ........ G02B 3/04; G02B 3/005; G02B 3/0068; G02B 3/08; B29D 11/00298; B29D 11/00442
See application file for complete search history.

(56) References Cited

U.S. PATENT DOCUMENTS 6,528,796 B1 * 3/2003 Kaifu .................... G01T 1/2018
　　　　　　　　　　　　　　　　　　 250/370.11
6,530,697 B1 * 3/2003 Johnson ............... G02B 6/4206
　　　　　　　　　　　　　　　　　　 385/33

(Continued)

FOREIGN PATENT DOCUMENTS

CN　　　101960362 A　　1/2011
CN　　　101965529 B　　1/2012

(Continued)

OTHER PUBLICATIONS

Machine translation of JP-2007292885-A (Year: 2007).*

(Continued)

*Primary Examiner* — Alicia M Harrington
(74) *Attorney, Agent, or Firm* — Sughrue Mion, PLLC

(57) ABSTRACT

An optical component includes: a first layer made of a first material having a first refractive index, the first layer including a first principal surface and a second principal surface opposite to the first principal surface; and a second layer made of a second material having a second refractive index different from the first refractive index, the second layer including a third principal surface and a fourth principal surface opposite to the third principal surface, and the first layer and the second layer are stacked such that the second principal surface and the third principal surface are in contact. A lens is formed on the first principal surface of the first layer, and a vortex profile is formed on the third principal surface of the second layer.

20 Claims, 20 Drawing Sheets

(56) References Cited

U.S. PATENT DOCUMENTS

| | | | |
|---|---|---|---|
| 7,760,445 | B2 | 7/2010 | Yu |
| 8,019,233 | B2 * | 9/2011 | Chen .................. G02B 19/0014 |
| | | | 359/9 |
| 8,442,365 | B2 | 5/2013 | Graham |
| 2002/0051421 | A1 | 5/2002 | Takeda |
| 2004/0091218 | A1 | 5/2004 | Haasteren |
| 2005/0264887 | A1 * | 12/2005 | Sato .................. G02B 27/4205 |
| | | | 359/566 |
| 2009/0226133 | A1 | 9/2009 | Jewell et al. |
| 2009/0290833 | A1 * | 11/2009 | Han ..................... G02B 3/0031 |
| | | | 264/1.7 |
| 2010/0110548 | A1 * | 5/2010 | Korenaga ............. G02B 5/1895 |
| | | | 427/163.1 |
| 2016/0082688 | A1 * | 3/2016 | Nakai ..................... B32B 27/16 |
| | | | 264/293 |
| 2016/0124149 | A1 * | 5/2016 | Chen .................... G02B 6/4206 |
| | | | 385/28 |

FOREIGN PATENT DOCUMENTS

| | | | | |
|---|---|---|---|---|
| CN | 103476565 | A | | 12/2013 |
| CN | 105572810 | A | | 5/2016 |
| EP | 0640850 | A2 * | 3/1995 | ............. G02B 3/005 |
| JP | 1263034 | A | | 10/1989 |
| JP | 2000114143 | A * | 4/2000 | ......... G03F 7/70316 |
| JP | 2007292885 | A * | 11/2007 | |
| JP | 2008046312 | A | | 2/2008 |
| JP | 2012243378 | A | | 12/2012 |
| JP | 2015-132694 | A | | 7/2015 |
| JP | 2016091014 | A | | 5/2016 |
| TW | 200510811 | A | | 3/2005 |
| WO | 2009098846 | A1 | | 8/2009 |
| WO | 2016/191142 | A2 | | 12/2016 |

OTHER PUBLICATIONS

Communication dated Feb. 3, 2021, issued by the Taiwanese Patent Office in application No. 107102281.
Communication dated Jan. 20, 2021, issued by the State Intellectual Property Office of the P.R.C. in application No. 201780083468.3.
"Laser and Infrared Detection Principle", edited by Dai Yongjiang, National Defense Industry Press, Oct. 2012, pp. 163-169 (8 pages).
Communication issued Jun. 30, 2021 by the Chinese Patent Office in Chinese Application No. 201780083468.3.
Communication dated Sep. 7, 2020, from the European Patent Office in European Application No. 17892162.3.
Communication dated Jul. 3, 2020, from The State Intellectual Property Office of the P.R. of China in Application No. 201780083468.3.
International Search Report dated Jan. 9, 2018, in International Application No. PCT/JP2017/042597.
International Preliminary Report on Patentability with translation of Written Opinion dated Jul. 23, 2019, in International Application No. PCT/JP2017/042597.

* cited by examiner

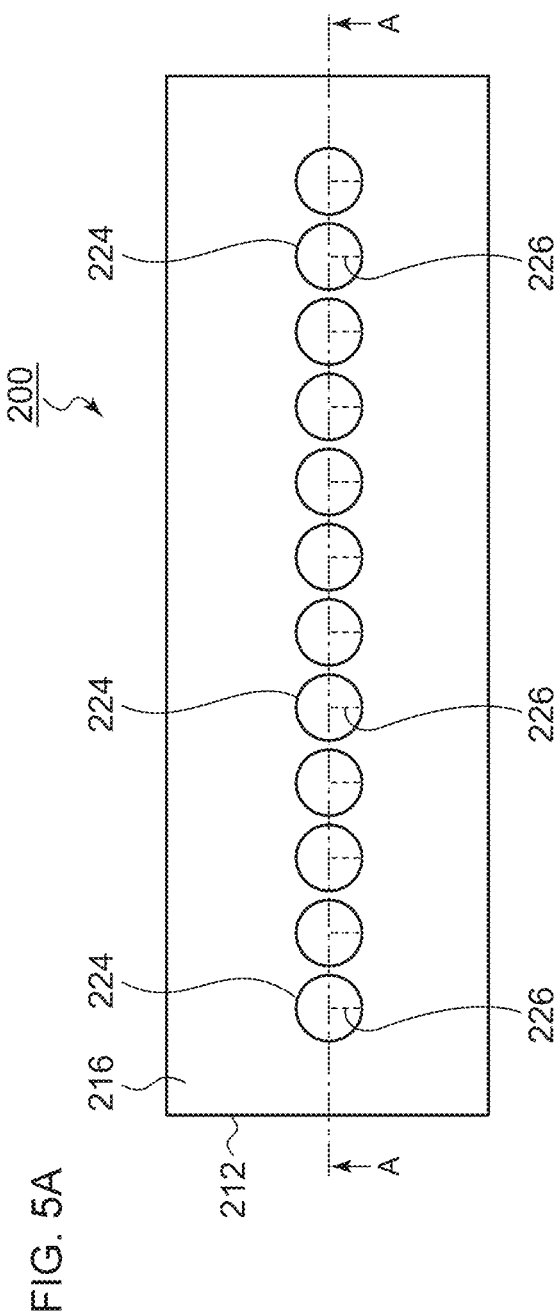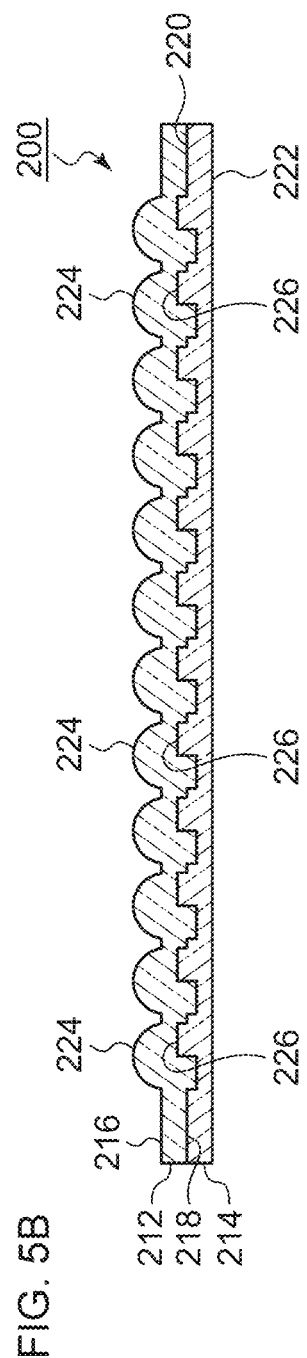

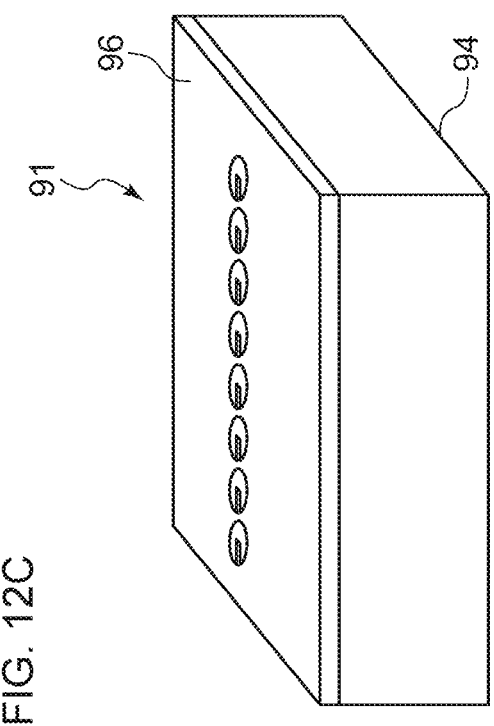
FIG. 12A
FIG. 12C
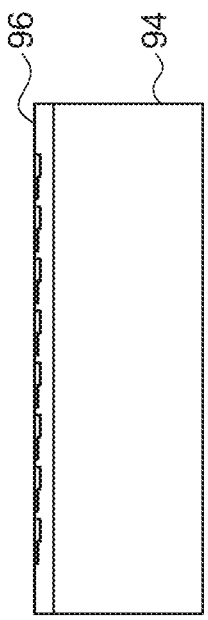
FIG. 12B
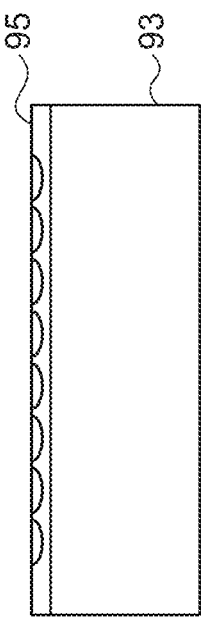
FIG. 12D

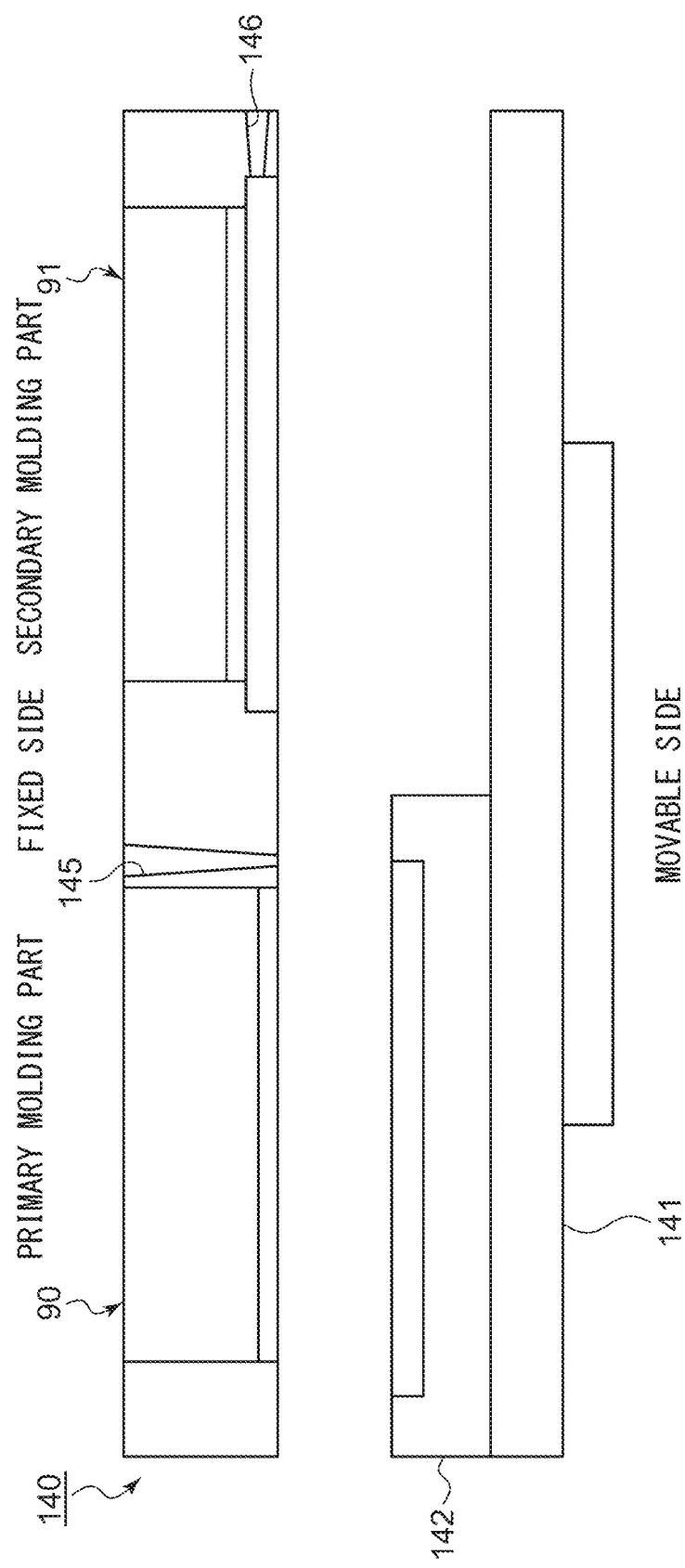

OPTICAL COMPONENT AND METHOD OF MANUFACTURING OPTICAL COMPONENT

BACKGROUND OF THE INVENTION

Field of the Invention

The present invention relates to optical components and a method of manufacturing optical components.

Background Art

The volume of data communication has increased explosively due to the widespread use of the Internet and cloud services. It has also become necessary to exchange a large volume of data at a high speed in a data center built to store data temporarily or to make Internet connections.

For short-range (10 m-1000 m) transmission such as that performed within a data center, optical communication is advantageous for the purpose of high-speed communication, although communication based on electrical signals is performed as well. Systems offering a transmission speed of several GHz-10 GHz built by a combination of a surface-emitting light source such as a vertical cavity surface emitting laser (VCSEL) and a multimode fiber have already been available for short-range optical communication.

Since a multimode fiber is designed such that the core where light travels is larger than that of a single-mode fiber, the light may be transmitted in a large number of modes within the core, producing differential modal dispersion (DMD). DMD degrades optical waveforms easily and so may restrict the transmission distance.

A method using a vortex phase plate for generating an optical vortex is known as a method for reducing DMD in a multimode fiber (e.g., patent document 1 or 2). Normally, light emitted from a laser presents a basic Gaussian light intensity distribution in which the intensity at the center is higher. A Gaussian light beam transmitted through a vortex phase plate can be transformed into a light having a ring-shaped light intensity distribution in which the intensity at the center is zero or reduced. A vortex phase plate is an optical component shaped in a plate in which a continuous or step-like spiral profile (vortex profile) is formed on one of the principal surfaces.

As is well known, the refraction index distribution in the central part of the core of a multimode fiber may be unstable, depending on the manufacturing method. The instability could be a factor to cause DMD (e.g., patent document 1 or 2). This is addressed by transmitting the light emitted from a laser through a vortex phase plate and transforming the light into a light having a ring-shaped light intensity distribution before causing the light to be incident on the multimode fiber. This inhibits the light from being directly incident on the central part of the core of the multimode fiber and inhibits the occurrence of DMD because the light is propagated within the core mainly in a so-called high-order propagation mode.

[patent document 1] JP2008-46312
[patent document 2] JP2016-91014

SUMMARY OF THE INVENTION

However, provision of a vortex phase plate between a light source and a multimode fiber increases the number of optical components for which light axes should be aligned and may make light axis adjustment more difficult as compared with the case where a vortex phase plate is not provided. Adjustment may be even more difficult in an optical system of an array type in which there are a plurality of such combinations of optical components.

The embodiment addresses the above-described issue, and a purpose thereof is to provide a technology that makes light axis adjustment easy in an optical system designed to generate an optical vortex.

MEANS TO SOLVE THE PROBLEM

An optical component according to an embodiment of the present invention includes: a first layer made of a first material having a first refractive index, the first layer including a first principal surface and a second principal surface opposite to the first principal surface; and a second layer made of a second material having a second refractive index different from the first refractive index, the second layer including a third principal surface and a fourth principal surface opposite to the third principal surface, wherein the first layer and the second layer are stacked such that the second principal surface and the third principal surface are in contact. A lens is formed on the first principal surface of the first layer, and a vortex profile is formed on the third principal surface of the second layer. As described above, a vortex profile has a continuous or step-like spiral profile and generates an optical vortex when transmitting light from a laser or the like.

Another embodiment of the present invention also relates to an optical component. The optical component includes: a first layer made of a first material having a first refractive index, the first layer including a first principal surface and a second principal surface opposite to the first principal surface; and a second layer made of a second material having a second refractive index different from the first refractive index, the second layer including a third principal surface and a fourth principal surface opposite to the third principal surface, wherein the first layer and the second layer are stacked such that the second principal surface and the third principal surface are in contact. A vortex profile is formed on the first principal surface of the first layer, and a lens is formed on the third principal surface of the second layer.

The optical component may further include: an optical device provided on the fourth principal surface of the second layer.

The optical component may further include: a substrate including a fifth principal surface and a sixth principal surface opposite to the fifth principal surface, and the second layer may be provided on the substrate such that the fourth principal surface and the fifth principal surface are in contact.

The optical component may further include: an optical device provided on the sixth principal surface of the substrate.

The optical device may be at least one of a lens, a polarizer, a wavelength plate, a phase plate, a prism, a diffraction grating, a filter, a mirror, a half mirror, a light emitting device, and a light receiving device.

Combinations each including the vortex profile and the lens may be arranged in an array.

A refractive index difference between the first refractive index and the second refractive index for a wavelength 850 nm may be 0.15 or greater.

Another embodiment of the present invention relates to a method of manufacturing the aforementioned optical component. The method includes: dropping the second material onto a mold for the second layer for molding the second layer; spreading the second material; curing the second material by irradiating the second material with light; demolding the mold for the second layer to retrieve the second layer; dropping the first material onto a mold for the first layer for molding the first layer; bonding the second layer to the mold for the first layer and spreading the first material; curing the first material by irradiating the first material with light; and demolding the mold for the first layer to retrieve a stack of the first layer and the second layer.

Another embodiment of the present invention also relates to a method of manufacturing the aforementioned optical component. The method includes: injecting the second material between the mold for the second layer for molding the second layer and a common mold; curing the second material by cooling the second material; opening the mold for the second layer and the common mold; injecting the first material between the mold for the first layer for molding the first layer and the common mold in which the second layer is formed; curing the first material by cooling the first material; and opening the mold for the first layer and the common mold and retrieving a stack of the first layer and the second layer.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5A and 5B show an optical component according to another embodiment of the present invention;

FIGS. 12A, 12B, 12C and 12D show molds for forming a lens and a vortex profile;

FIG. 18 is a schematic view showing a configuration of a molding machine;

MODE FOR CARRYING OUT THE INVENTION

Figure 1:
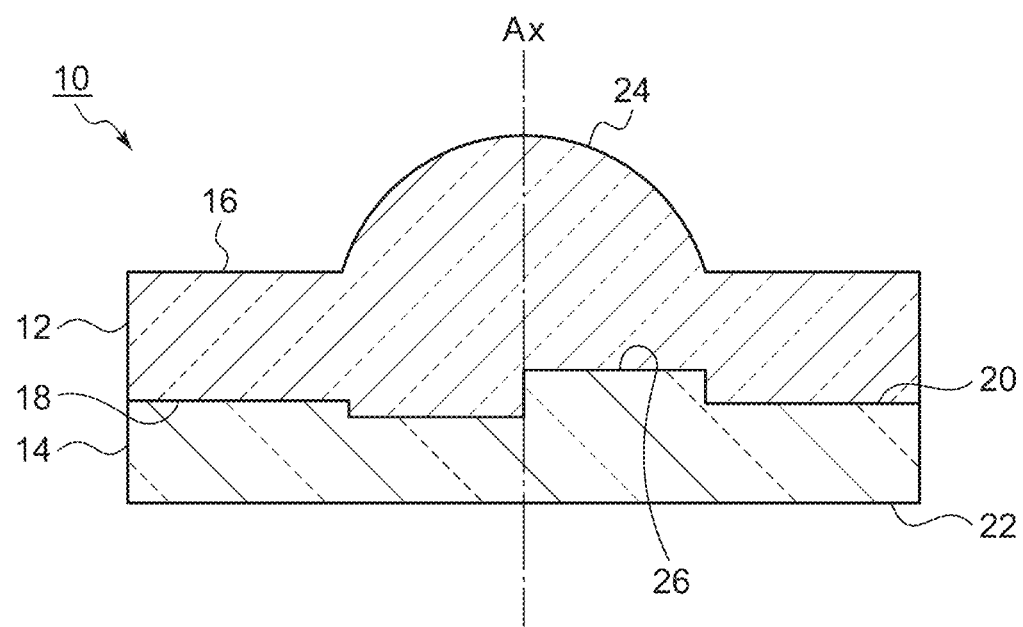
FIG. 1 is a schematic cross-sectional view for illustrating an optical component according to the embodiment of the present invention.

A description will now be given of an optical component according to an embodiment of the present invention. This optical component is an optical component that includes a vortex profile. Identical or like constituting elements, members, processes shown in the drawings are represented by identical symbols and a duplicate description will be omitted. The preferred embodiments do not intend to limit the scope of the invention but exemplify the invention. Not all of the features and the combinations thereof described in the embodiments are necessarily essential to the invention.

FIG. 1 is a schematic cross-sectional view for illustrating an optical component 10 according to the embodiment of the present invention; As shown in FIG. 1, the optical component 10 includes a stack of a first layer 12 and a second layer 14. The first layer 12 is made of a first material having a first refractive index $n_1$. The second layer 14 is made of a second material having a second refractive index $n_2$. The first refractive index $n_1$ and the second refractive index $n_2$ differ from each other (i.e., n1≠n2).

For example, the first layer 12 may be made of a high-refractivity material having the first refractive index $n_1$=about 1.7, and the second layer 14 may be made of a low-refractivity material having the second refractive index $n_2$=about 1.4. Alternatively, the first layer 12 may be made of a low-refractivity material having the first refractive index $n_1$=about 1.4, and the second layer 14 may be made of a high-refractivity material having the second refractive index $n_2$=about 1.7. The larger the absolute value of the refractive index difference $\Delta n = n_2 - n_1$ between the materials, the larger the refractive power of the optical system including the stack of the layers, or the lower the step difference in the vortex profile described later (the difference between the highest part and the lowest part of the vortex profile). For example, resin or glass can be used as a material for forming the first layer 12 and the second layer 14. A sol-gel glass material that can be made into a thin film easily and can form a microstructure may be used. The phase difference $\Delta \varphi$ is given by $\Delta \varphi = 2\pi \times m_c \times \Delta n \times d / \lambda$, where d denotes the step difference in the vortex profile, $m_c$ denotes the charge representing the number of repetitions (the number of cycles), in the vortex profile, of shapes having a step difference d per one circle, and $\lambda$ denotes the wavelength used.

The first layer 12 has a first principal surface 16 and a second principal surface 18 opposite to the first principal surface 16. The second layer 14 has a third principal surface 20 and a fourth principal surface 22 opposite to the third principal surface 20. The first layer 12 and the second layer 14 are stacked such that the second principal surface 18 and the third principal surface 20 are in contact.

A lens 24 is formed on the first principal surface 16 of the first layer 12. The lens 24 shown in FIG. 1 is a spherical convex lens, but the lens can be a spherical concave lens, an aspherical convex lens, an aspherical concave lens, a diffraction lens (a Fresnel lens), etc.

A vortex profile 26 is formed on the third principal surface 20 of the second layer 14. The vortex profile 26 is a spiral optical element formed continuously or in steps around the light axis and has the function of generating an optical vortex, i.e., transforming the incident light into a light having a phase difference in the circumferential direction. Such a function can also be realized by a spiral diffraction grating or a device having an effective refractive index that varies at each predetermined rotational angle in the circumferential direction. Methods for changing the effective refractive index include but not limited to forming a large number of holes of a size equal to or smaller than the used wavelength in the material and varying the density of the holes. By using any of the elements described above, the incident light is transformed into a light having a phase difference in the circumferential direction, and the light intensity distribution that occurs when the light is condensed by a lens would be ring-shaped. Any of various types of the vortex profile 26 may be used depending on the phase difference that should be provided. For example, a profile that provides a phase difference of $2\pi$ in one circle (the charge $m_c=1$, the phase difference $\Delta\varphi=2\pi$), a profile that provides a phase difference continuously through 360°, a profile that provides a phase difference of $2\pi$ per 180° ($m_0=2$, $\Delta\varphi=2\pi\times2$), a profile that provides a phase difference of $2\pi$ per 120° ($m_c=3$, $\Delta\varphi=2\pi\times3$), or the like may be used. When the phase difference $\Delta\varphi$ is $2\pi\times m$, a light beam having a ring-shaped light intensity distribution with the highest axial symmetry around the central axis is obtained. m is an integer and denotes the order of the vortex profile or the vortex phase plate. It should be noted that the vortex profile 26 shown in FIG. 1 is a schematic representation of the cross-sectional shape of the vortex profile.

The lens 24 formed on the first principal surface 16 of the first layer 12 and the vortex profile 26 formed on the third principal surface 20 of the second layer 14 are arranged such that their light axes are aligned (the aligned light axis shall be represented as a light axis Ax of the optical component 10).

The third principal surface 20 of the second layer 14 is shaped to conform to the shape of the second principal surface 18 in contact with the third principal surface 20. Further, the fourth principal surface 22 of the second layer 14 is formed in a planar shape.

Figure 2:
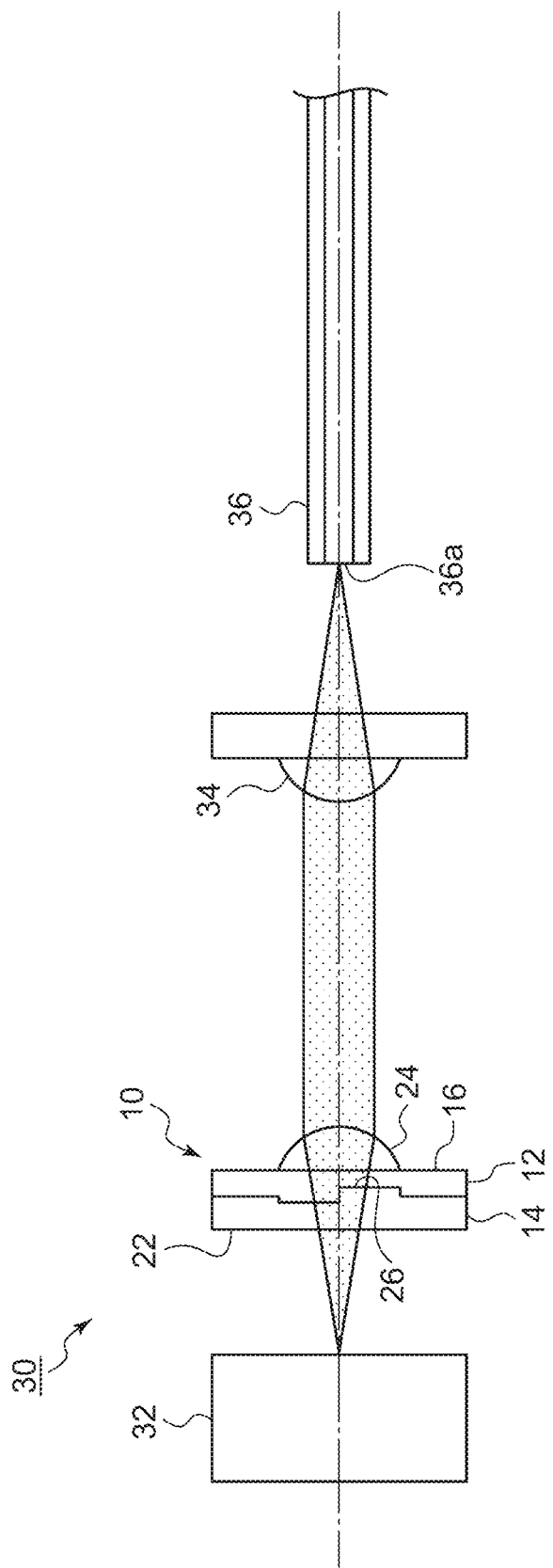
FIG. 2 shows a schematic configuration of an optical module in which the optical component according to the embodiment is used.

FIG. 2 shows a schematic configuration of an optical module 30 in which the optical component 10 according to the embodiment is used. As shown in FIG. 2, the optical module 30 is provided with a light source 32, the optical component 10, a condensing lens 34, and a multimode fiber 36. FIG. 2 shows how the light emitted from the light source 32 is incident on a core 36a of the multimode fiber 36 via the optical component 10 and the condensing lens 34.

A surface-emitting laser such as a VCSEL or a laser diode can be used as the light source 32. The optical component 10 is arranged such that the fourth principal surface 22 of the second layer 14 is the incidence surface that receives the light from the light source 32. The light incident entering the second layer 14 from the fourth principal surface 22 is transformed into a light having a ring-shaped light intensity distribution by the vortex profile 26. The light is incident on the first layer 12 and is turned into a parallel light by the lens 24 formed on the first principal surface 16 of the first layer 12 before exiting the optical component 10. The parallel light is condensed by the condensing lens 34 provided to face the optical component 10 and is incident on the core 36a of the multimode fiber 36. FIG. 2 shows an exemplary embodiment, and an equivalent function can be realized by other configurations. For example, the lens surface of the optical component 10 may face the light source 32. Still alternatively, the optical component 10 and the condensing lens 34 may be replaced. The optical system may be such that a collimated light is incident on the vortex profile.

Figure 3B:
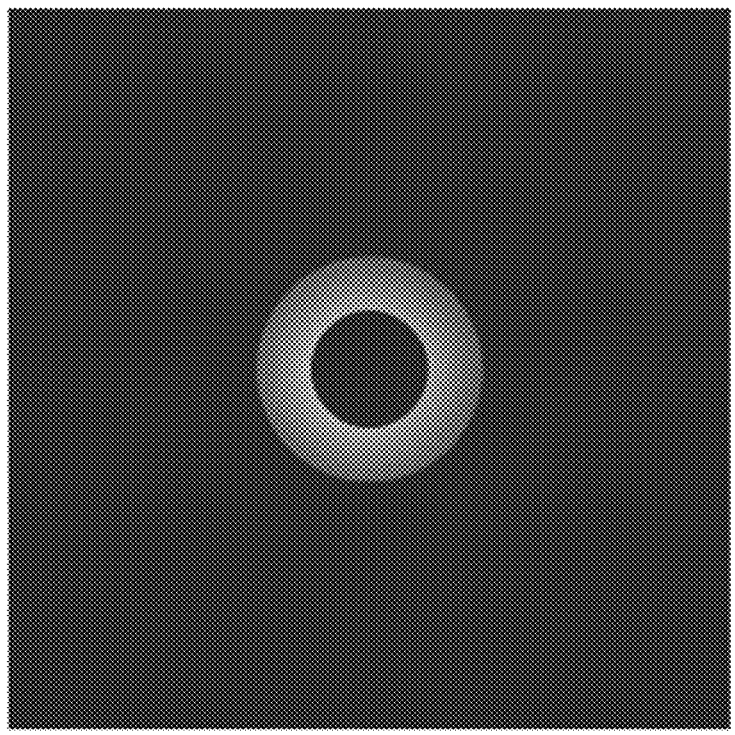
FIGS. 3A and 3B show intensity distributions of the light incident on a multimode fiber.
Figure 3A:
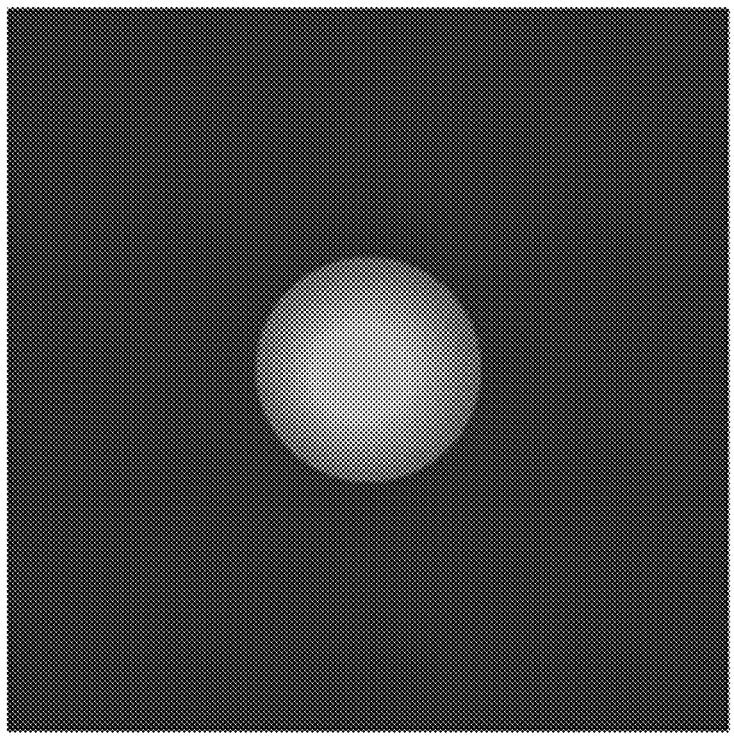

FIGS. 3A and 3B show intensity distributions of the light incident on a multimode fiber. FIG. 3A shows a comparative example and shows an intensity distribution of the light incident on the multimode fiber when a mere collimating lens is provided in the optical module 30 shown in FIG. 2 in place of the optical component 10. FIG. 3B shows an intensity distribution of the light incident on the multimode fiber when the optical component 10 according to the embodiment is used.

A comparison between FIGS. 3A and 3B reveals that a light having a ring-shaped intensity distribution in which the intensity at the center is lowered can be incident on the core 36a of the multimode fiber 36 by using the optical component 10 according to the embodiment. This eliminates light incident on the central part of the core 36a, where the refractive index may be unstable. Accordingly, the occurrence of DMD is reduced, and the optical transmission performance of the optical module 30 is improved as a result.

In the case the vortex phase plate and the two other lenses (i.e., the collimating lens and the condensing lens) are formed as separate components and using the components as combined in the optical module, it is necessary to align the light axes of the vortex phase plate and the other lenses. As will be obvious, however, adjustment of light axes will be difficult as the number of optical components is increased. By integrating the vortex profile 26 that turns the light from the light source into a ring-shaped light and the lens 24 that turns the light transmitted through the vortex profile 26 into a parallel light, the optical component 10 can be used as if it is a single ordinary lens. Since it only requires aligning the light axes of the two components, i.e., the optical component 10 and the condensing lens 34, light axis adjustment will be easier as compared with the case of adjusting the light axes of the vortex phase plate and two other lenses. This will provide even greater advantage when an optical component including an array of a plurality of stacks is used.

An antireflection layer may be formed on the surface of the optical component 10 according to the embodiment exposed to a medium external to the optical component (e.g., air), i.e., the first principal surface 16 (the lens 24) and the fourth principal surface 22 in order to suppress reflection loss. The antireflection layer may be formed by a dielectric multilayer film, a microstructure having a period of 10-1000 nanometers, a matching layer having a refractive index intermediate between the refractive index of the external medium and the refractive index of the optical device, or the like.

Figure 4:
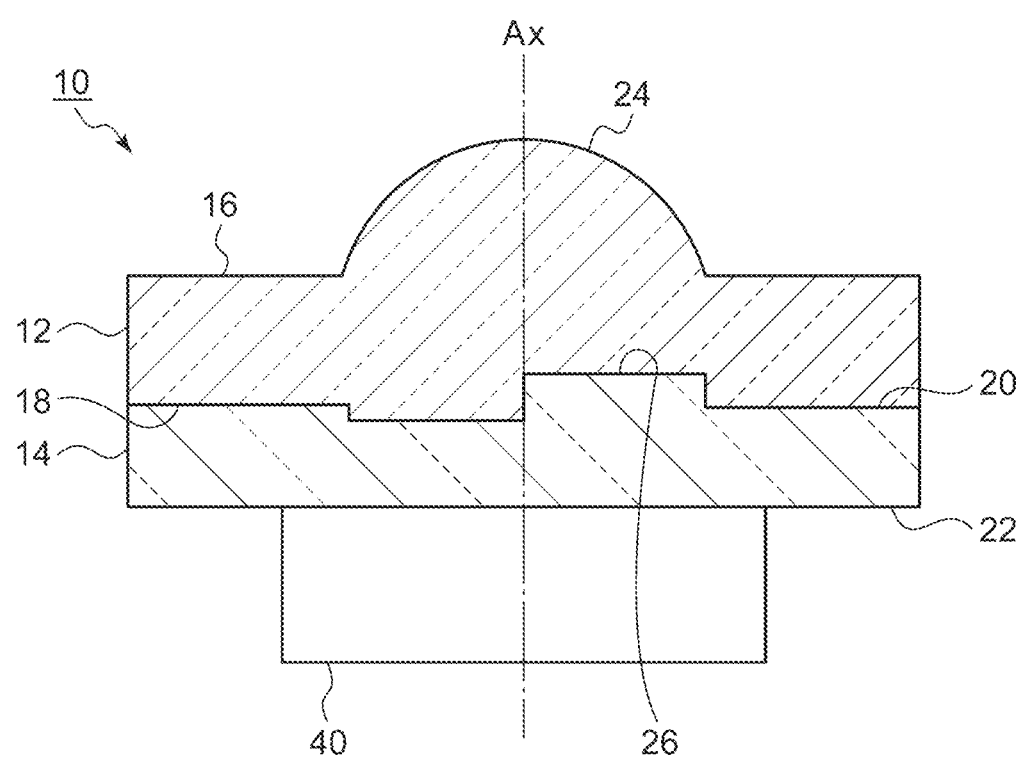
FIG. 4 shows an embodiment in which an optical device is combined with the optical component.

FIG. 4 shows an embodiment in which an optical device 40 is combined with the optical component 10. As described above, the fourth principal surface 22 of the second layer 14 is formed in a planar shape. Therefore, the other optical device 40 can be provided on the fourth principal surface 22 as desired. The optical device 40 provided on the fourth principal surface 22 may be a lens, a polarizer, a wavelength plate, a phase plate, a prism, a diffraction grating, a filter, a mirror, a half mirror, a light emitting device, a light receiving device, or the like. The planar shape of the fourth principal surface 22 is also advantageous in that an electrode, a metal wiring, or the like may be formed on the surface before mounting a light emitting device, a light receiving device, or the like. By providing the optical device 40 on the fourth principal surface 22, the space required for the optical module is reduced more successfully than when the optical device 40 and the optical component 10 are provided separately and at a distance. Since the optical device 40 is directly fixed to the optical component 10, there is an added advantage in that light axis adjustment of the optical device 40 and the optical component 10 is easy and a shift between the light axes is unlikely to occur once the device is fixed.

FIGS. 5A and 5B show an optical component 200 according to another embodiment of the present invention. FIG. 5a is a top view and FIG. 5B is an A-A cross-sectional view of FIG. 5A.

The embodiment shown in FIG. 2 is a case where light is incident on a single multimode fiber 36. In the case a plurality of multimode fibers 36 are arranged for spatial multiplexing, an array of the optical component 200 and the condensing lens 34 (see FIG. 2) as shown in FIGS. 5A and 5B is used, where the optical component 200 includes an array of combinations of a lens 224 and a vortex profile 226 for which light axes are aligned.

The optical component 200 is configured such that a first layer 212 in which a plurality of lenses 224 are formed in an array (on a line) on a first principal surface 216 and a second layer 214 in which a plurality of vortex profiles 226 are formed in an array (on a line) on a third principal surface 220 are stacked such that a second principal surface 218 and the third principal surface 220 are in contact. A fourth principal surface 222 of the second layer 214 is formed in a planar shape. The first layer 212 is made of the first material having the first refractive index $n_1$, and the second layer 214 is made of the second material having the second refractive index $n_2$. The first refractive index $n_1$ and the second refractive index $n_2$ differ from each other (i.e., $n_1 \neq n_2$).

The use of the optical component 200 according to this embodiment only requires adjusting the light axes of the optical component 200 and the condensing lens 34 and so makes light axis adjustment far easier than the case of adjusting the light axes of the vortex profile in an array pattern and the two other lenses.

Figure 6:
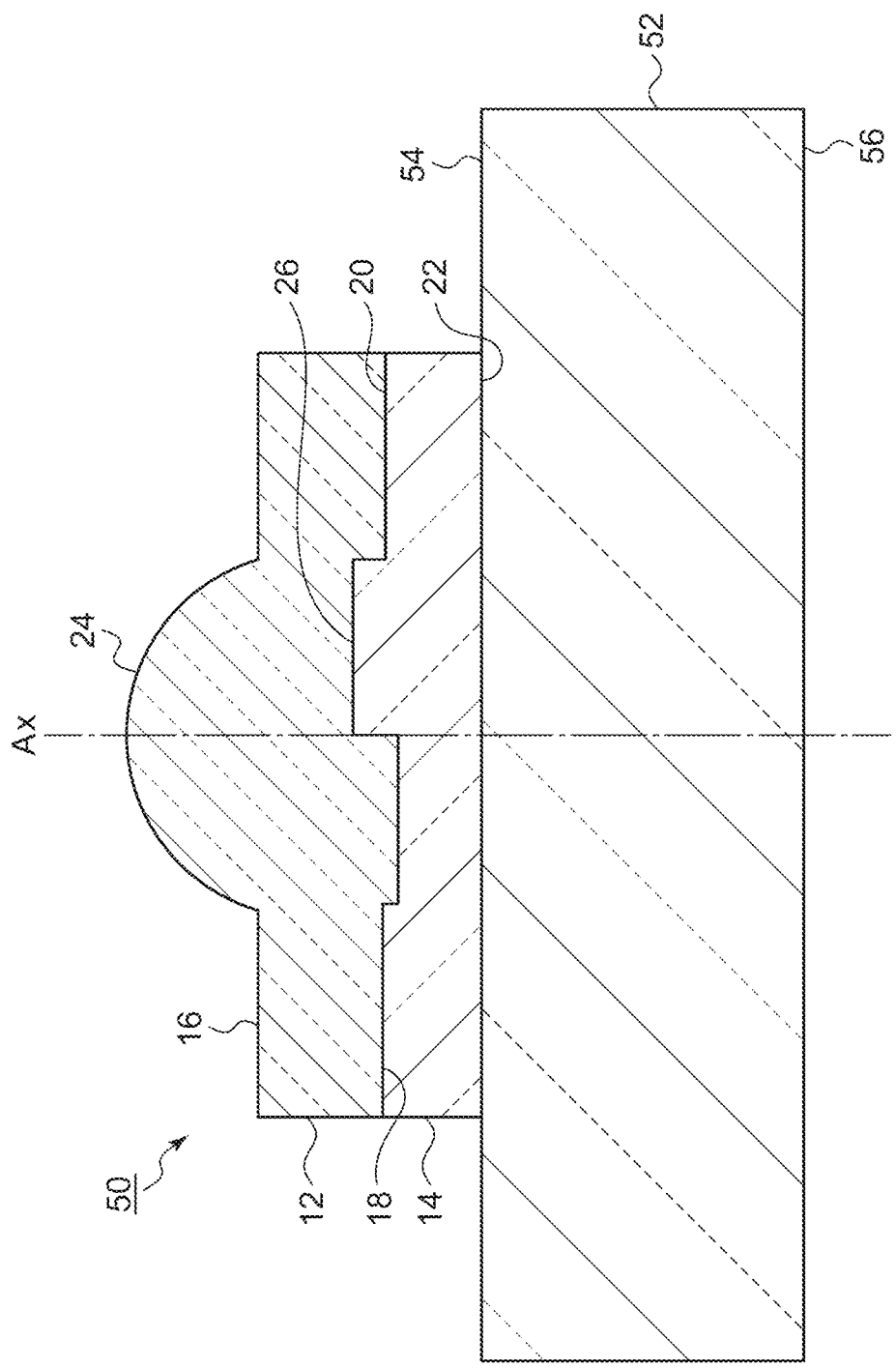
FIG. 6 is a schematic cross-sectional view for illustrating an optical component according to still another embodiment of the present invention.

FIG. 6 is a schematic cross-sectional view for illustrating an optical component 50 according to still another embodiment of the present invention. As shown in FIG. 6, the optical component 50 is further provided with a substrate 52 and has a configuration in which a stack of the first layer 12 and the second layer 14 described with reference to FIG. 1 is provided on the substrate 52. The substrate 52 is a member shaped in a flat plate made of resin or glass and has a fifth principal surface 54 and a sixth principal surface 56 opposite to the fifth principal surface 54. The stack of the first layer 12 and the second layer 14 is provided such that the fourth principal surface 22 of the second layer 14 is in contact with the fifth principal surface 54 of the substrate 52. Like the optical components described above, the optical component 50 formed in this way also makes it easy to adjust light axes when an optical module is built. A dielectric substrate that is transparent at the wavelength in use (e.g., 850 nm) is used for the substrate 52. For example, a transparent resin such as cycloolefin, glass, or the like is used for the substrate 52.

Figure 7:
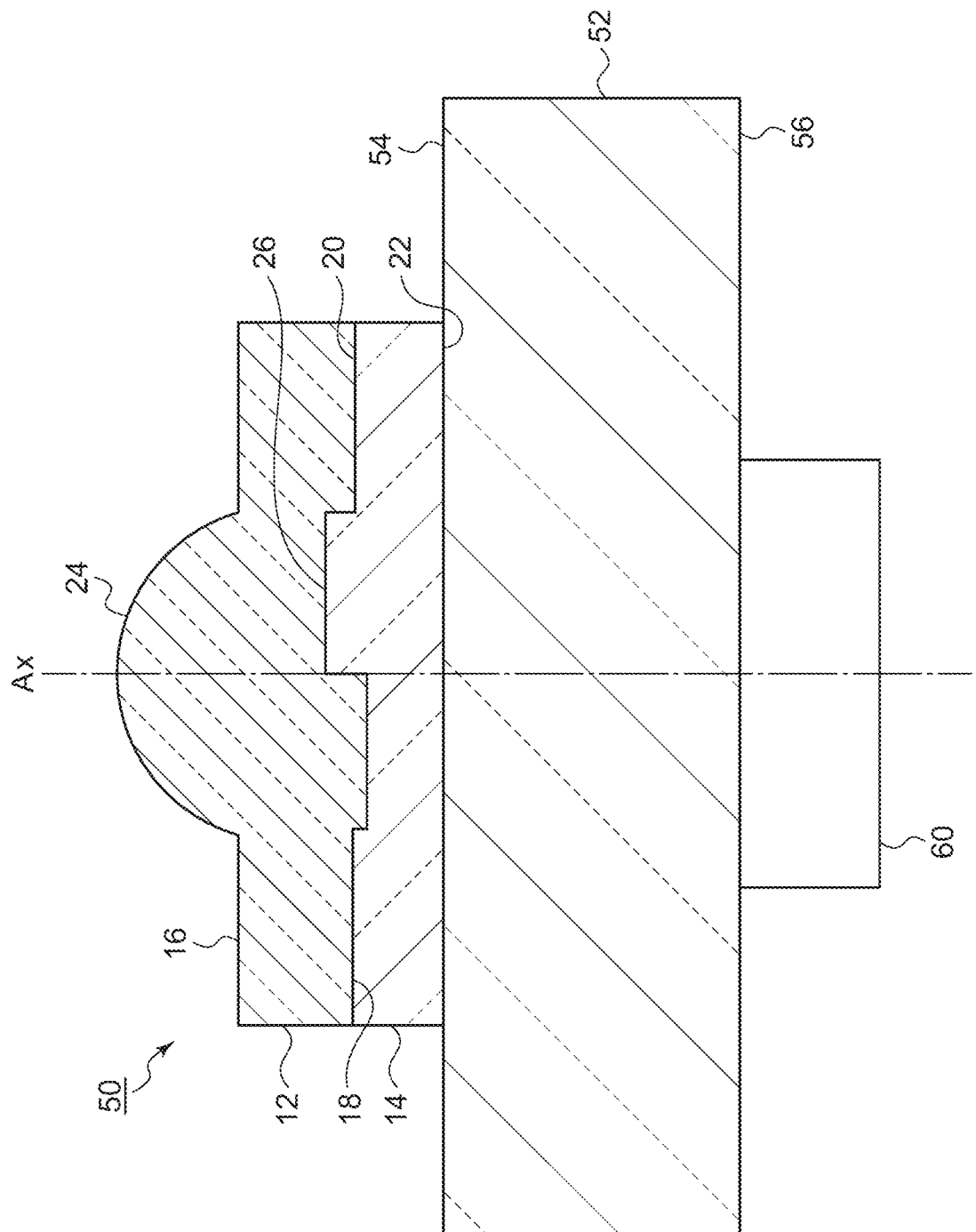
FIG. 7 shows an embodiment in which an optical device is combined with the optical component.

FIG. 7 shows an embodiment in which an optical device 60 is combined with the optical component 50. The sixth principal surface 56 of the substrate 52 has a planar shape. Therefore, the other optical device 60 can be provided on the sixth principal surface 56 of the substrate 52 as desired. The optical device 60 provided on the sixth principal surface 56 may be a lens, a polarizer, a wavelength plate, a phase plate, a prism, a diffraction grating, a filter, a mirror, a half mirror, a light emitting device, a light receiving device, or the like. An electrode, a metal wiring, or the like may be formed on the sixth principal surface 56 before mounting a light emitting device, a light receiving device, or the like. It is possible to improve the level of integration by using an interposer comprised of a transparent glass substrate containing through-glass-via (TGV) or the like for the substrate 52. Therefore, the embodiment of FIG. 7 is advantageous in this aspect as well.

Figure 8A:
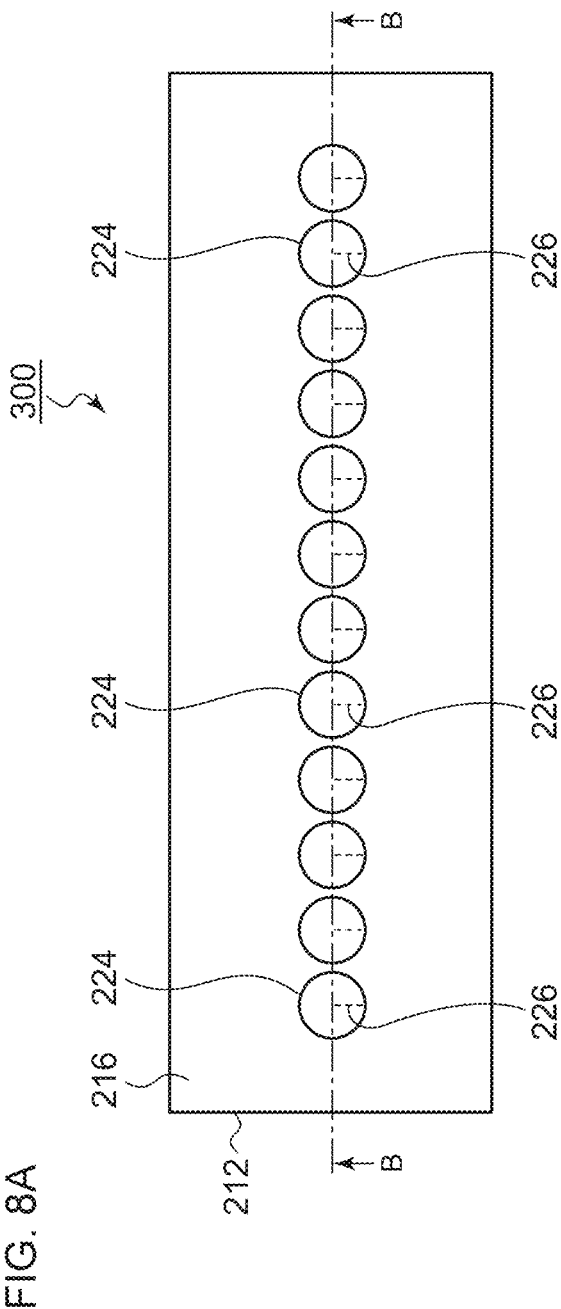
FIGS. 8A and 8B show an optical component according to yet another embodiment of the present invention.
Figure 8B:
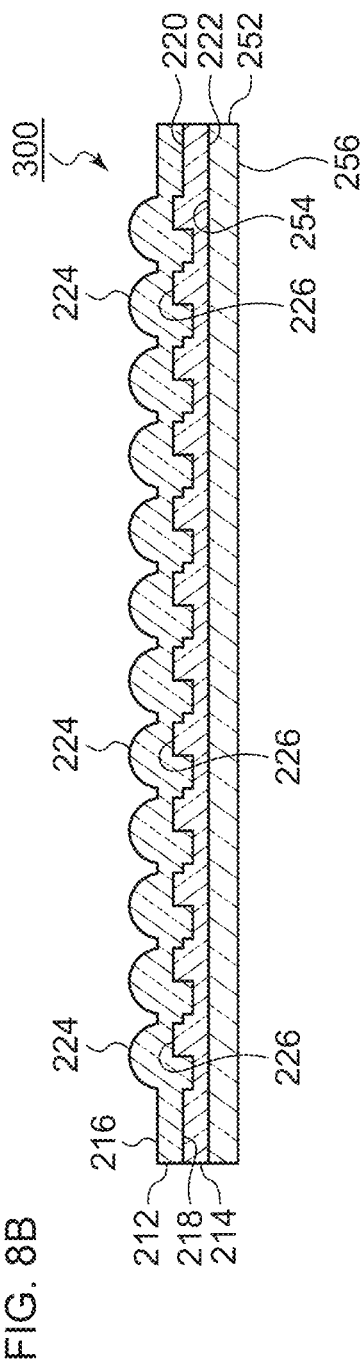

FIGS. 8A and 8B show an optical component 300 according to yet another embodiment of the present invention. FIG. 8A is a top view, and FIG. 8B is a B-B cross-sectional view of FIG. 8A.

As shown in FIG. 8B, the optical component 300 according to this embodiment is further provided with a substrate 252 and has a configuration in which a stack of the first layer 212 and the second layer 214 described with reference to FIGS. 5A and 5B is provided on the substrate 252. The substrate 252 is a member shaped in a flat plate made of resin or glass and has a fifth principal surface 254 and a sixth principal surface 256 opposite to the fifth principal surface 254. The stack of the first layer 212 and the second layer 214 is provided such that the fourth principal surface 222 of the second layer 214 is in contact with the fifth principal surface 254 of the substrate 252. Like the optical components described above, the optical component 300 formed in this way also makes it easy to adjust light axes when an optical module is built. A dielectric substrate that is transparent at the wavelength in use (e.g., 850 nm) is used for the substrate 252. For example, a transparent resin such as cycloolefin, glass, or the like is used for the substrate 252.

Figure 9A:
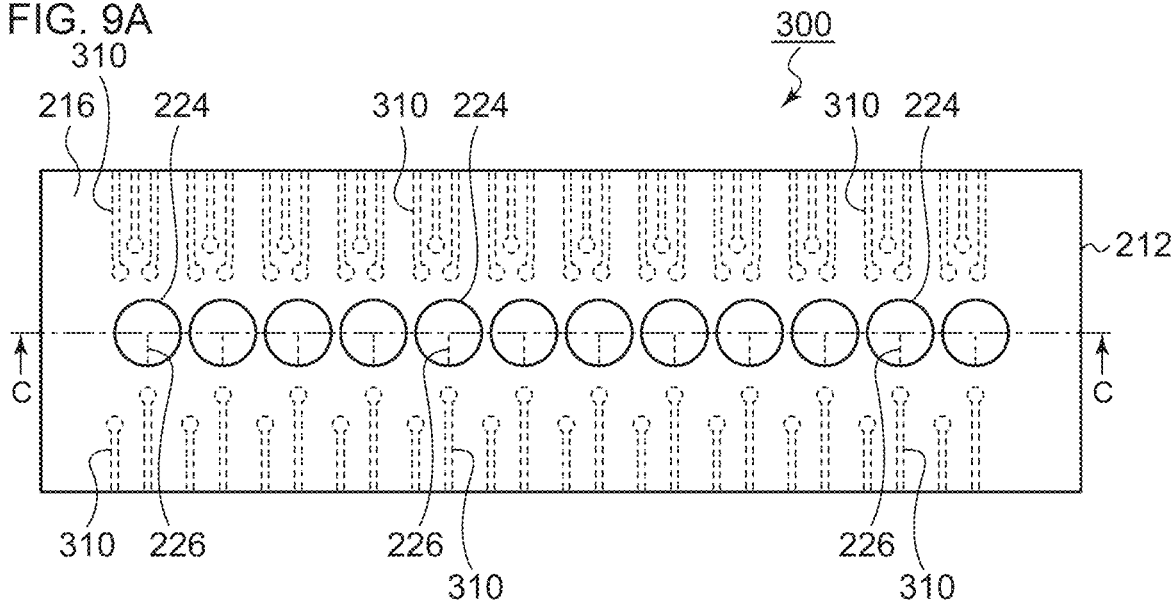
FIGS. 9A, 9B and 9C show an embodiment in which a metal wiring is formed on the substrate of the optical component.
Figure 9B:
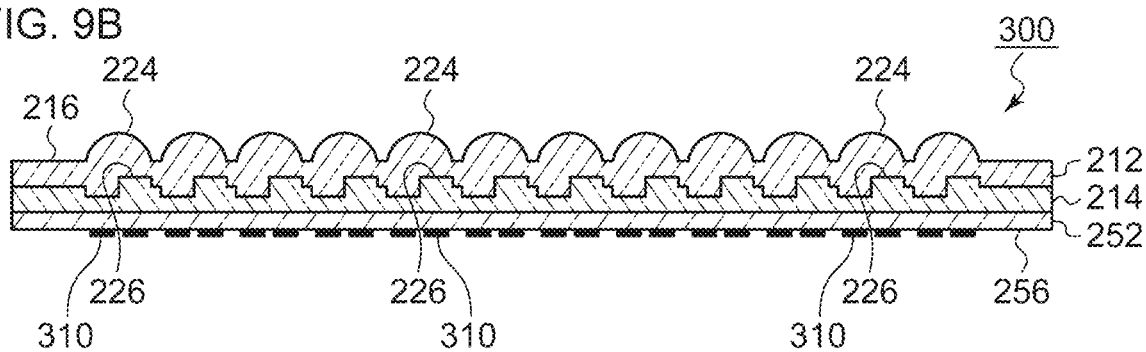
Figure 9C:
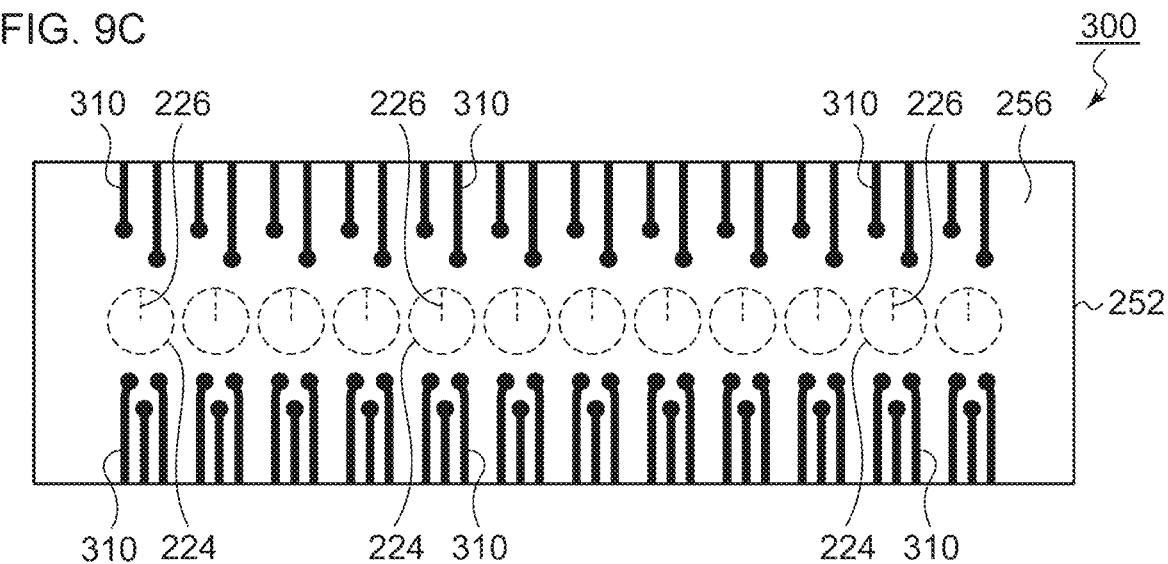

FIGS. 9A-9C show an embodiment in which a metal wiring 310 is formed on the substrate 252 of the optical component 300. FIG. 9A is a top view, FIG. 9B is a C-C cross-sectional view of FIG. 9A, and FIG. 9C is a bottom view. As shown in FIGS. 9A-9C, the metal wiring 310 is formed on the sixth principal surface 256 of the substrate 252 for each combination of the lens 224 and the vortex profile 226.

Figure 10A:
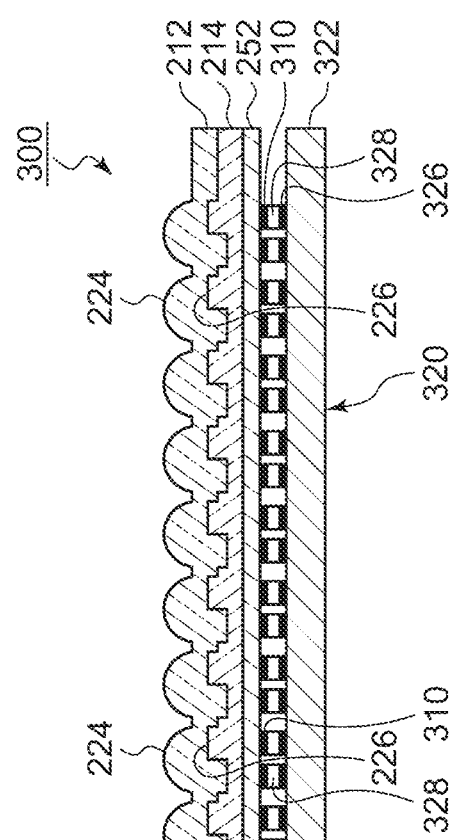
FIGS. 10A and 10B show an embodiment in which a VCSEL array substrate is mounted by flip-chip bonding on the substrate of the optical component in which the metal wiring 310 is formed.
Figure 10B:
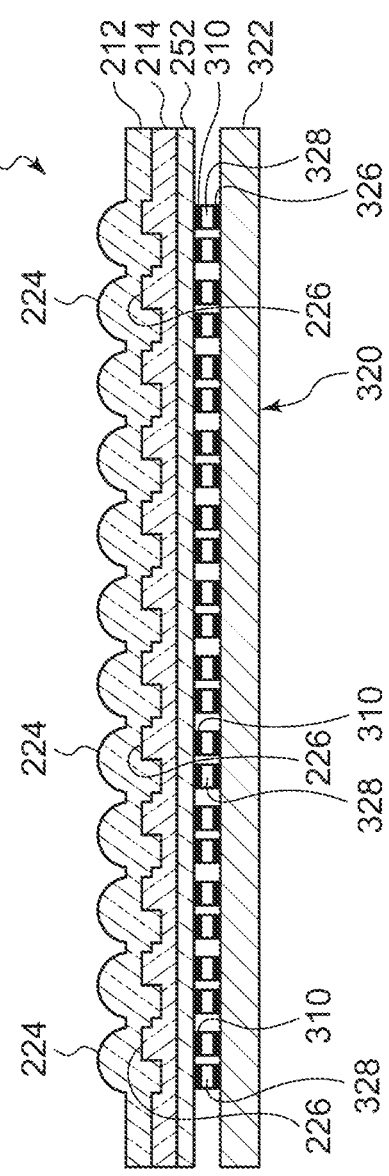

FIGS. 10A and 10B show an embodiment in which a VCSEL array 320 is mounted by flip-chip bonding on the substrate 252 of the optical component 300 in which the metal wiring 310 is formed. FIG. 10A is a cross-sectional view through a plane perpendicular to the direction of arrangement of the lenses, etc., and FIG. 10B is a cross-sectional view through a plane parallel to the direction of arrangement of the lenses, etc.

The VCSEL array 320 is built by forming a plurality of VCSELs 324 in an array (on a line) on a substrate 322. One VCSEL 324 is arranged for each combination of the lens 224 and the vortex profile 226. As shown in FIGS. 10A and 10B, a metal wiring 326 formed on the substrate 322 is connected to the metal wiring 310 formed on the substrate 252 of the optical component 300 by using a solder bump 328. Mounting the VCSEL array 320 directly on the optical component 300 in this way improves the level of integration and reduces the space required for the optical module. Also, since the VCSEL array 320 is directly fixed to the optical component 300, light axis adjustment of the VCSEL array 320 and the optical component 300 is easy, and a shift between the light axes is unlikely to occur once the array is fixed.

Figure 11:
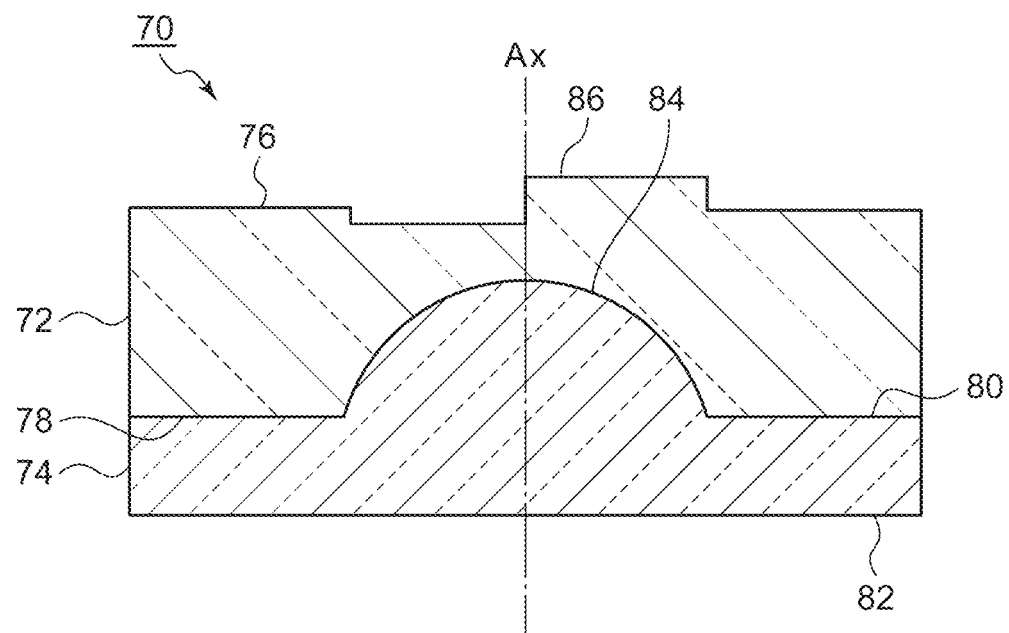
FIG. 11 is a schematic cross-sectional view for illustrating an optical component according to still another embodiment of the present invention.

FIG. 11 is a schematic cross-sectional view for illustrating an optical component 70 according to still another embodiment of the present invention. As shown in FIG. 11, the optical component 70 according to this embodiment is configured, like the optical component 10 shown in FIG. 1, such that a first layer 72 made of the first material having the first refractive index $n_1$ and a second layer 74 made of the second material having the second refractive index $n_2$ are stacked. The first refractive index $n_1$ and the second refractive index $n_2$ differ from each other (i.e., $n_1 \neq n_2$).

The first layer 72 has a first principal surface 76 and a second principal surface 78 opposite to the first principal surface 76. The second layer 74 has a third principal surface 80 and a fourth principal surface 82 opposite to the third principal surface 80. The first layer 72 and the second layer 74 are stacked such that the second principal surface 78 and the third principal surface 80 are in contact.

The optical component 70 according to this embodiment differs from the optical component 10 shown in FIG. 1 in that a vortex profile 86 is formed on the first principal surface 76 of the first layer 72, and a lens 84 is formed on the third principal surface 80 of the second layer 74. The lens 84 shown in FIG. 11 is a spherical convex lens, but the lens can be a spherical concave lens, an aspherical convex lens, an aspherical concave lens, a diffraction lens (a Fresnel lens), etc.

The optical component 70 according to this embodiment, in which the vortex profile 86 is formed on the first principal surface 76 exposed to a medium external to the optical component (e.g., air) and the lens 84 is formed at the interface between the first layer 72 and the second layer 74 in the optical component 70, is equally applicable to the optical module as shown in FIG. 2. The optical component 70 also makes it easy to adjust light axes when an optical module is built because the optical component 70 can be used as if it is an ordinary lens by integrating the lens 84, which turns the light from the light source into a parallel light, and the vortex profile 86, which turns the parallel light transmitted through the lens 84 into a ring-shaped light. The phase difference $\Delta \varphi$ of the vortex profile 86 is given by $\Delta \varphi = 2\pi \times m_c \times (n_1 - 1) \times d / \lambda$, given that the refractive index of air is 1.

Since the fourth principal surface 82 of the second layer 74 is formed in a planar shape in the optical component 70 according to this embodiment, too, the other optical device 40 (as shown in FIG. 4) can be provided on the fourth principal surface 82 as desired. The optical device provided on the fourth principal surface 82 may be a lens, a polarizer, a wavelength plate, a phase plate, a prism, a diffraction grating, a filter, a mirror, a half mirror, a light emitting device, a light receiving device, or the like. The advantage of providing a principal surface in a planar shape is as described above.

A description will now be given of a method of manufacturing the optical components described above. Two representative manufacturing methods will be explained.
(1) Photo Polymerization (2P) Molding 2P molding is ultraviolet-cured molding and is a molding method in which a mold having an optically designed shape is filled with an ultraviolet curable resin and is bonded to a plate of glass, acryl, or the like as a substrate, the resin is cured by ultraviolet irradiation, and then the assembly is demolded to transfer the inverted shape of the mold onto the substrate.

A description will be given of a case where a glass substrate is used as an underlying member, a lens is formed by the 2P molding method on the first principal surface of the first layer by using a high-refractivity material, and a vortex profile is formed on the third principal surface of the second layer by using a low-refractivity material.

FIGS. 12A-12D show molds for forming a lens and a vortex profile. FIG. 12A is a schematic perspective view of a mold 90 for a lens. FIG. 12B is a schematic cross-sectional view of the mold 90 for a lens. FIG. 12C is a schematic perspective view of a mold 91 for a vortex profile. FIG. 12D is a schematic cross-sectional view of the mold 91 for a vortex profile.

The mold 90 for a lens and the mold 91 for a vortex profile are manufactured as a master mold by working a mold base produced by applying electroless nickel phosphorous plating 95, 96 on the surface of a stainless steel member 93, 94, using an ultra-nanofabrication machine and an ultraprecision cutting tool. These master molds, which are metal molds, can be used as a mold for 2P molding. However, a metal master mold cannot transmit ultraviolet rays and so imposes a restriction that makes it necessary to use an ultraviolet-transmissive material for the 2P molding substrate. It is therefore desired to form a replica mold on a glass substrate by 2P molding and use the replica mold as a mold for 2P molding. The approach also provides the benefit of protecting the master mold and so is desired from the perspective of preventing handling damage as well.

A description will first be given of fabrication of a replica mold. The ultraviolet curable resin used to fabricate a replica mold need not be the same as the ultraviolet curable resin used to mold the optical component of the present invention. An ultraviolet curable resin having excellent repetitive transferability or shape (dimension) stability (e.g., showing low cure shrinkage) is used for a replica mold.

The master mold for a lens is designed based on a specification that uses a refractive index 1.70 (wavelength of 850 nm) of the ultraviolet curable resin material used to form a lens and that turns the light emitted from a surface emitting laser (VCSEL) at a radiation angle 20° into a parallel light. More specifically, the master mold is designed to form an aspherical lens array in which eight lenses each having a lens diameter=φ0.24 mm and a lens height (sag)=0.033 mm are arranged on a transparent substrate at intervals of 0.25 mm.

Figure 13A:
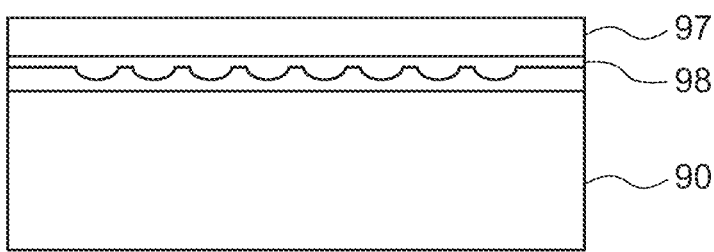
FIGS. 13A, 13B, 13C and 13D show steps of fabricating a replica mold for a lens.
Figure 13B:
Figure 13C:
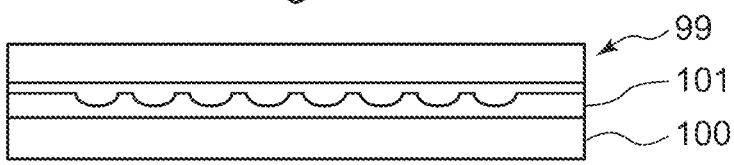
Figure 13D:
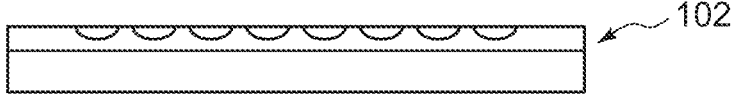

FIGS. 13A-13D show steps of fabricating a replica mold for a lens. First, as shown in FIG. 13A, the mold 90 for a lens in which the inverted lens shape (concave shape) is formed is used as a master mold. A convex-shaped replica mold is formed by 2P molding on a glass substrate 97, using an ultraviolet curable resin 98. FIG. 13B shows a convex-shaped replica mold 99 as completed. Subsequently, as shown in FIG. 13C, the convex-shaped replica mold 99 is used to form a concave-shaped replica mold by 2P molding on a glass substrate 100, using an ultraviolet curable resin 101. FIG. 13D shows a concave-shaped replica mold 102 as completed.

A description will now be given of fabrication of a replica mold for a vortex profile. Before giving the description, a preferred mode of the vortex profile will be discussed. The light beam obtained by a combination of a vortex profile and a lens exhibits a ring-shaped light intensity distribution having high axial symmetry when the phase difference $\Delta \varphi$ of the vortex profile is $2\pi \times m$ (m is the order of the vortex profile and is an integer). Further, the larger the absolute value of the phase difference of the vortex profile, the larger the beam diameter (ring diameter) of the light beam.

Meanwhile, a proper beam diameter of a light beam incident on a multimode fiber is determined. If the beam diameter is too small, the beam will be easily affected by the center of the core of the multimode fiber, and it will be difficult to reduce DMD. If the beam diameter is too large, the beam will be easily coupled to a so-called high-order propagation mode of the multimode fiber with the result that bending loss occurs easily. Thus, the beam diameter of light incident on the multimode fiber is designed to be 10-50 µm in this embodiment. The term beam diameter refers to the maximum diameter at an intensity $1/e^2$ of the maximum value in the light intensity distribution and refers to a diameter of a ring in the case of a ring-shaped beam.

In light of the focal distance of the lens used in conjunction with the vortex profile and of the performance like diffraction limit, a vortex profile having the order m of 6, i.e., having the phase difference $\Delta\varphi=2\pi\times 6$ has been planned.

The vortex profile is designed based on the absolute value of 0.33 of the difference $\Delta n$ between the refractive index 1.37 (wavelength of 850 nm) of the ultraviolet curable resin used to mold the vortex profile and the refractive index of the ultraviolet curable resin for a lens formed in the layer (i.e., the first layer) above the vortex profile. The phase difference $\Delta\varphi$ of the vortex profile may be positive or negative depending on whether the order is positive or negative or whether $\Delta n$ is positive or negative. In the case the absolute values of the phase differences are equal and the positive/negative signs are opposite, it merely means that the spiral directions of the optical vortexes are opposite, and the resultant light intensity distributions do not exhibit any difference. For the purpose of discussing the phase difference of the vortex profile, therefore, the sign of the terms is assumed to be positive (+).

Based on the above discussion, eight vortex profiles having a charge $m_c=1$, a diameter=$\varphi 0.24$ mm, and the maximum step difference d=0.015 mm are arranged at 0.25 mm pitch.

The absolute value of the phase difference remains unchanged in a master mold for a vortex profile and in a replica mold thereof, despite the inverted shapes. A replica mold fabricated in one-step transfer molding and a replica mold fabricated in two-step transfer molding can both be used as a mold for 2P molding for forming the optical component of the present invention. This increases the use efficiency of a metal mold as compared with the case of ordinary convex or concave lenses for which either an even number of transfer steps or an odd number of transfer steps can be used and is favorable in that a backup is easy to obtain when the mold is damaged due to some factor or another.

Figure 14A:
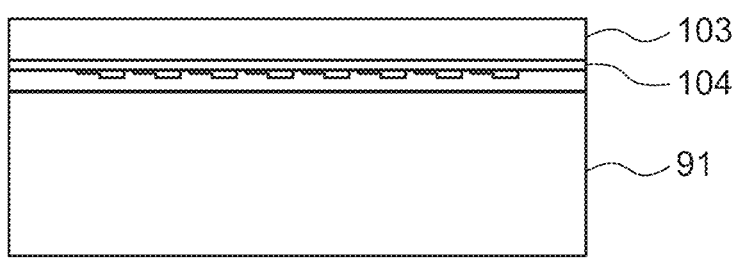
FIGS. 14A and 14B show steps of fabricating a replica mold for a vortex profile.
Figure 14B:
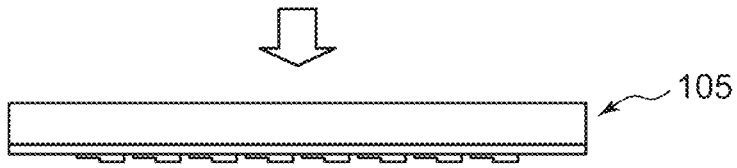

FIGS. 14A and 14B show steps of fabricating a replica mold for a vortex profile. As shown in FIG. 14A, the mold 91 for a vortex profile is used as a master mold. A convex-shaped replica mold is formed by 2P molding on a glass substrate 103, using an ultraviolet curable resin 104. FIG. 14B shows a convex-shaped replica mold 105 as completed.

It is desired that the mold 90 for a lens, the mold 91 for a vortex profile, and the replica mold for 2P molding of the optical component of the present invention be coated with a mold release agent to facilitate demolding after the ultraviolet curable resin has cured. The mold release agent is diluted by a fluorine-based coating agent to 0.1%. The mold is spin-coated or dip-coated with the agent and maintained in a high-temperature, high-humidity atmosphere of 60° C. and about 90% RH for an hour or more to complete the coating step.

The glass substrate may be transparent at the wavelength used (e.g., 850 nm). Soda lime glass, borosilicate glass, or alkali-free glass that does not contain an alkali metal element substantially can be used. In the case an interposer comprised of a glass substrate containing TGV is used as a substrate, in particular, the high-frequency characteristics will be poor if the glass substrate contains an alkali metal element. It is therefore advantageous to use alkali-free glass for the substrate. It is desired that the glass substrate be treated with a silane coupling agent to improve adhesion (strength of bonding) to the ultraviolet curable resin for molding the vortex profile.

Figure 15A:
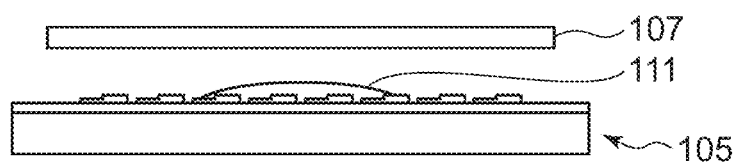
FIGS. 15A, 15B, 15C and 15D show steps of fabricating a vortex profile in an array pattern on a substrate.

FIGS. 15A-15D show steps of fabricating a vortex profile in an array pattern. First, as shown in FIG. 15A, an ultraviolet curable resin 111 is dropped onto the replica mold 105 for molding the vortex profile. The ultraviolet curable resin 111 may be an acrylate-based ultraviolet curable resin having a refractive index of 1.37 (wavelength of 850 nm) after curing and an optical transmittance of 90%.

Figure 15B:

As shown in FIG. 15B, a glass substrate 107 is then bonded to the resin, and the ultraviolet curable resin 111 is spread as far as a target resin spreading area. In the case it is necessary to align the positions of the glass substrate 107 and the vortex profile (e.g., in the case an opening is provided in the glass substrate 107), the ultraviolet curable resin 111 is spread while also aligning the positions of a target in the glass substrate 107 and a target in the replica mold 105, by using a microscope.

Figure 15C:
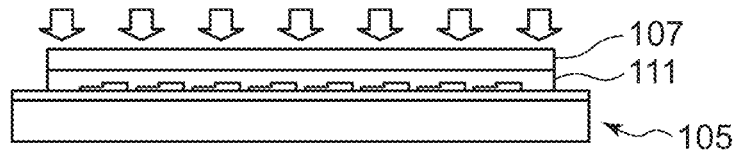
Figure 15D:
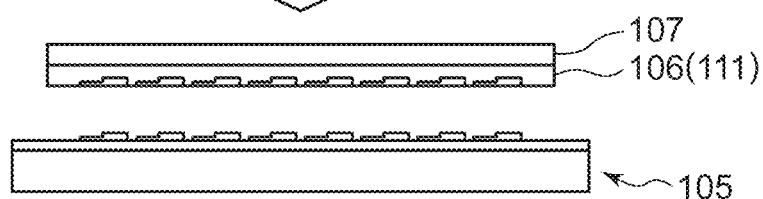

As shown in FIG. 15C, the ultraviolet curable resin 111 is cured by ultraviolet irradiation. After the ultraviolet curable resin 111 is cured, the replica mold 105 is demolded as shown in FIG. 15D to obtain a molded vortex profile layer 106.

FIGS. 16A-16D show steps of fabricating a lens array. A molded lens layer (the first layer 12 of the optical component 10 shown in FIG. 1) is molded on the molded vortex profile layer 106 (the second layer 14 of the optical component 10 shown in FIG. 1) fabricated in the steps of FIGS. 15A-15D.

Figure 16A:
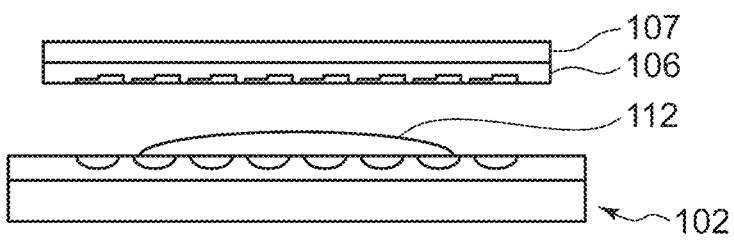
FIGS. 16A, 16B, 16C and 16D show steps of fabricating a lens array on a substrate.

First, as shown in FIG. 16A, an ultraviolet curable resin 112 is dropped onto the replica mold 102 for molding a lens. The ultraviolet curable resin 112 may be an acrylate-based ultraviolet curable resin. The ultraviolet curable resin may have a refractive index of 1.70 (wavelength of 850 nm) after curing and an optical transmittance of 80%.

Figure 16B:
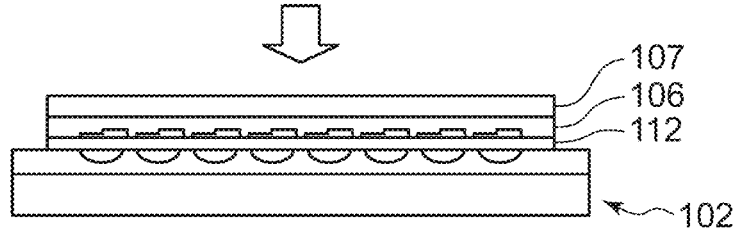

As shown in FIG. 16B, the resin is then bonded to the molded vortex profile layer 106 molded on the glass substrate 107, and the ultraviolet curable resin 112 is spread as far as a target resin spreading area, while also aligning the positions of a target in the molded vortex profile layer 106 and a target in the replica mold 102 for molding the lens. For alignment of the vortex profile and the lens, the ultraviolet curable resin 112 is spread while also aligning the positions of the targets in the vortex profile and those in the lens.

Figure 16C:
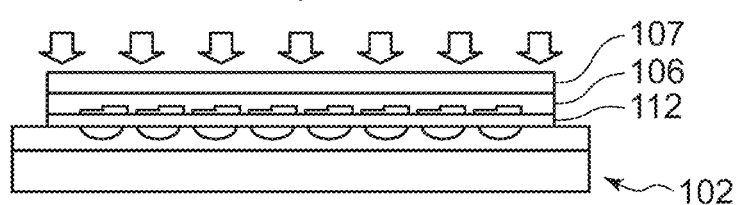
Figure 16D:
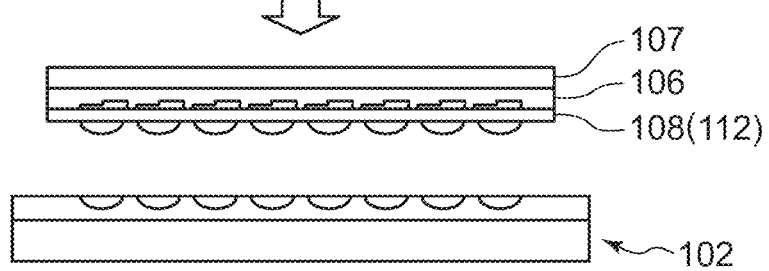

As shown in FIG. 16C, the ultraviolet curable resin 112 is cured by ultraviolet irradiation. After the ultraviolet curable resin 112 is cured, the replica mold 102 is demolded as shown in FIG. 16D to obtain a molded lens layer 108.

Figure 17A:
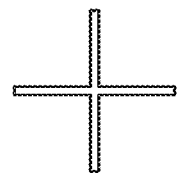
FIGS. 17A, 17B and 17C show targets for aligning the positions of the vortex profile and the lens.
Figure 17B:
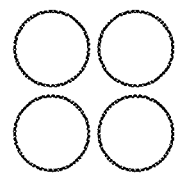
Figure 17C:
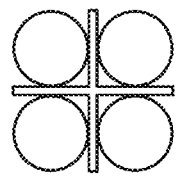

FIGS. 17A-17C show targets for aligning the positions of the vortex profile and the lens. FIG. 17A is a target in the molded vortex profile layer 106. FIG. 17B is a target in the replica mold 102 for molding a lens. FIG. 17C show that the target in the molded vortex profile layer 106 and the target in the replica mold 102 for molding a lens are aligned.

In the above description, the method of manufacturing an optical component in which a lens is formed on the first principal surface of the first layer and a vortex profile is formed on the third principal surface of the second layer is explained. An optical component in which a vortex profile is formed on the first principal surface of the first layer and a lens is formed on the third principal surface of the second layer can be manufactured by a similar method.

(2) Injection Molding (Two-Color Molding)

A description will now be given of injection molding (two-color molding) An explanation will be given of a case of forming a vortex profile on the first principal surface of the first layer by using a low-refractivity material and a lens is formed on the third principal surface of the second layer by using a high-refractivity material. In this embodiment, an underlying material (substrate) is not used.

In injection molding, as in 2P molding, molds similar to those described with reference to FIGS. 12A-12D (the mold 90 for a lens and the mold 91 for a vortex profile) are used.

In two-color molding, a material having a higher injection molding temperature (resin melting temperature) is used on the primary side (primary molding material) than in the secondary side (secondary molding material). In this case, a lens is molded on the primary side by using polycarbonate (PC), and a vortex profile is molded on the secondary side by using acrylic (PMMA).

The lens mold (piece) is designed based on, for example, a specification that uses a refractive index 1.64 (wavelength of 850 nm) of PC, which is a material for molding the lens, and that turns the light emitted from a surface emitting laser (VCSEL) at a radiation angle 20° into a parallel light. More specifically, the lens mold is designed to form an aspherical lens array in which eight lenses each having a lens diameter=φ0.24 mm and a lens height (sag)=0.035 mm are arranged at intervals of 0.25 mm.

As in the case of 2P molding, the mold (piece) for a vortex profile is designed to produce a phase difference of $2\pi \times 6$ at the wavelength $\lambda$=850 nm and is designed based on the absolute value of 0.15 of the difference $\Delta n$ between the refractive index 1.49 (wavelength of 850 nm) of PMMA used to mold the vortex profile and the refractive index 1.64 of PC for a lens formed in a layer (i.e., the second layer) below the vortex profile. More specifically, eight vortex profiles having a charge $m_c$=1, a diameter=φ0.24 mm, and the maximum step difference d=0.034 mm are arranged at intervals of 0.25 mm.

FIG. 18 is a schematic view showing a configuration of a molding machine 140. As shown in FIG. 18, the mold (piece) 90 for a lens and the mold (piece) 91 for a vortex profile are arranged on the cavity on the fixed side, and a common mold 142 is mounted as a core on a rotary table 141 on the movable side.

First, as shown in FIG. 18, the common mold 142 is placed in the primary molding part so as to mold the lens. The injection unit (not shown) that comes with the injection molding machine is used to inject resin between the mold 90 for a lens and the common mold 142 via a primary side sprue 145.

Figure 19:
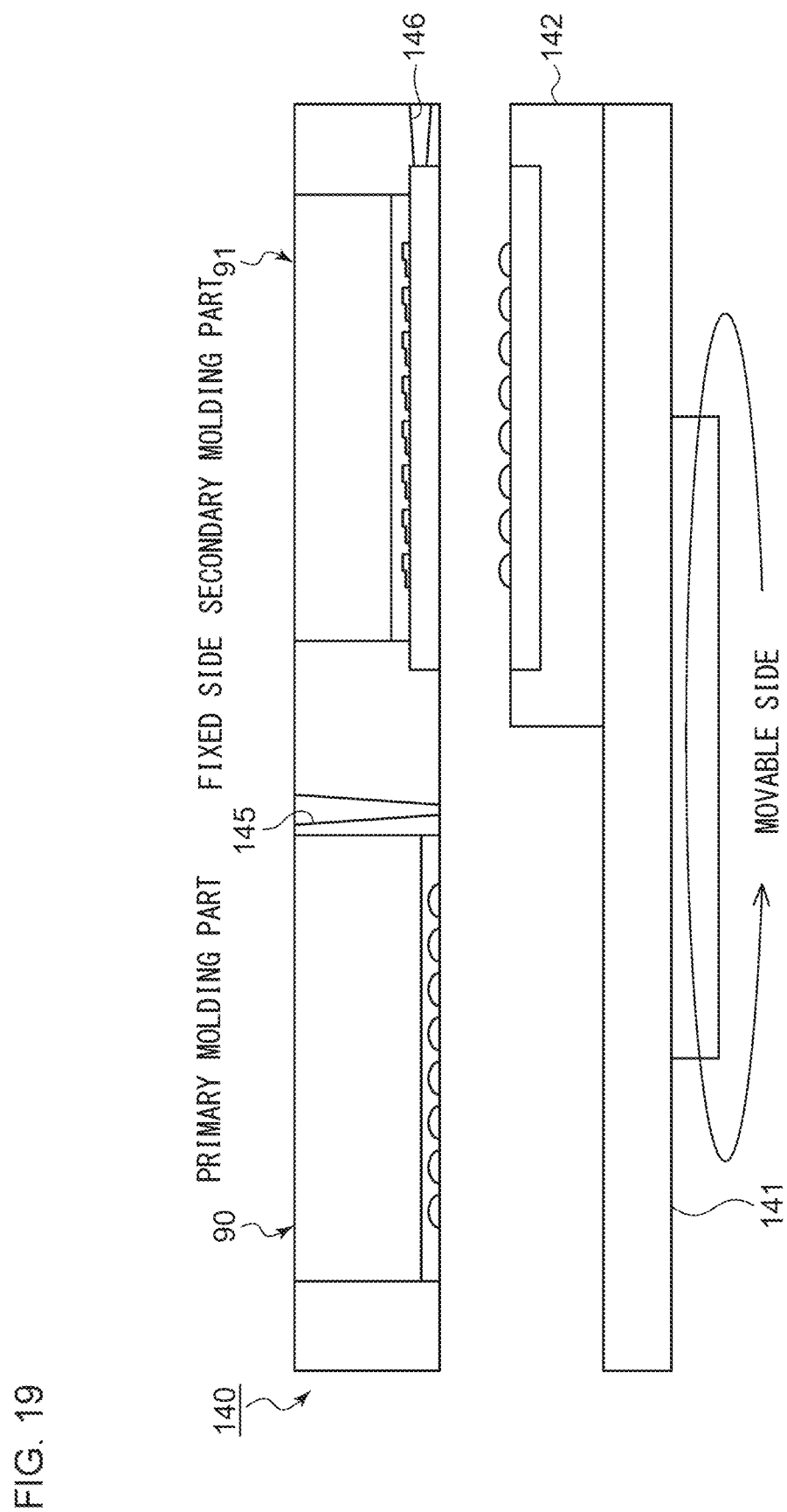
FIG. 19 shows molding of a vortex profile in an array pattern.

FIG. 19 shows molding of a vortex profile. As shown in FIG. 19, the rotary table 141 is turned after the mold is opened so as to move the common mold 142, in which the lens is formed, to the secondary molding part.

Figure 20:
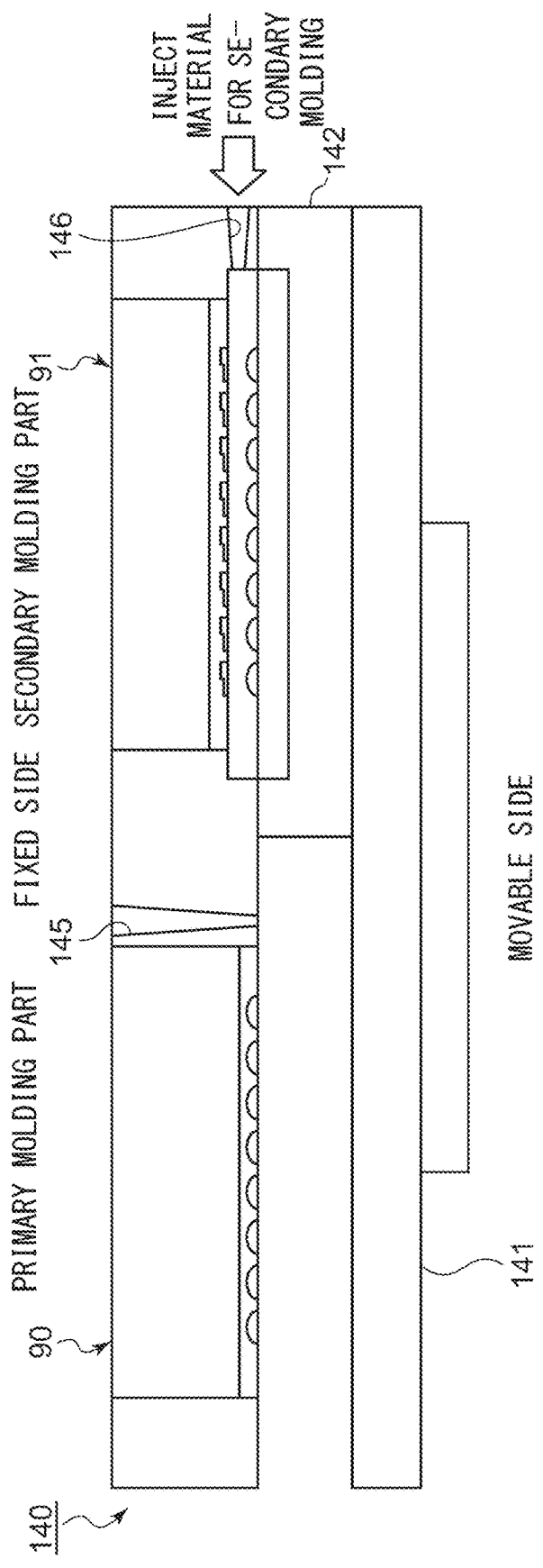
FIG. 20 shows how resin is injected to mold the vortex profile in an array pattern.

FIG. 20 shows how resin is injected to mold the vortex profile. The injection unit (not shown) attached to the mold is used to inject resin between the mold 91 for a vortex profile and the common mold 142 via a secondary side sprue 146.

Figure 21:
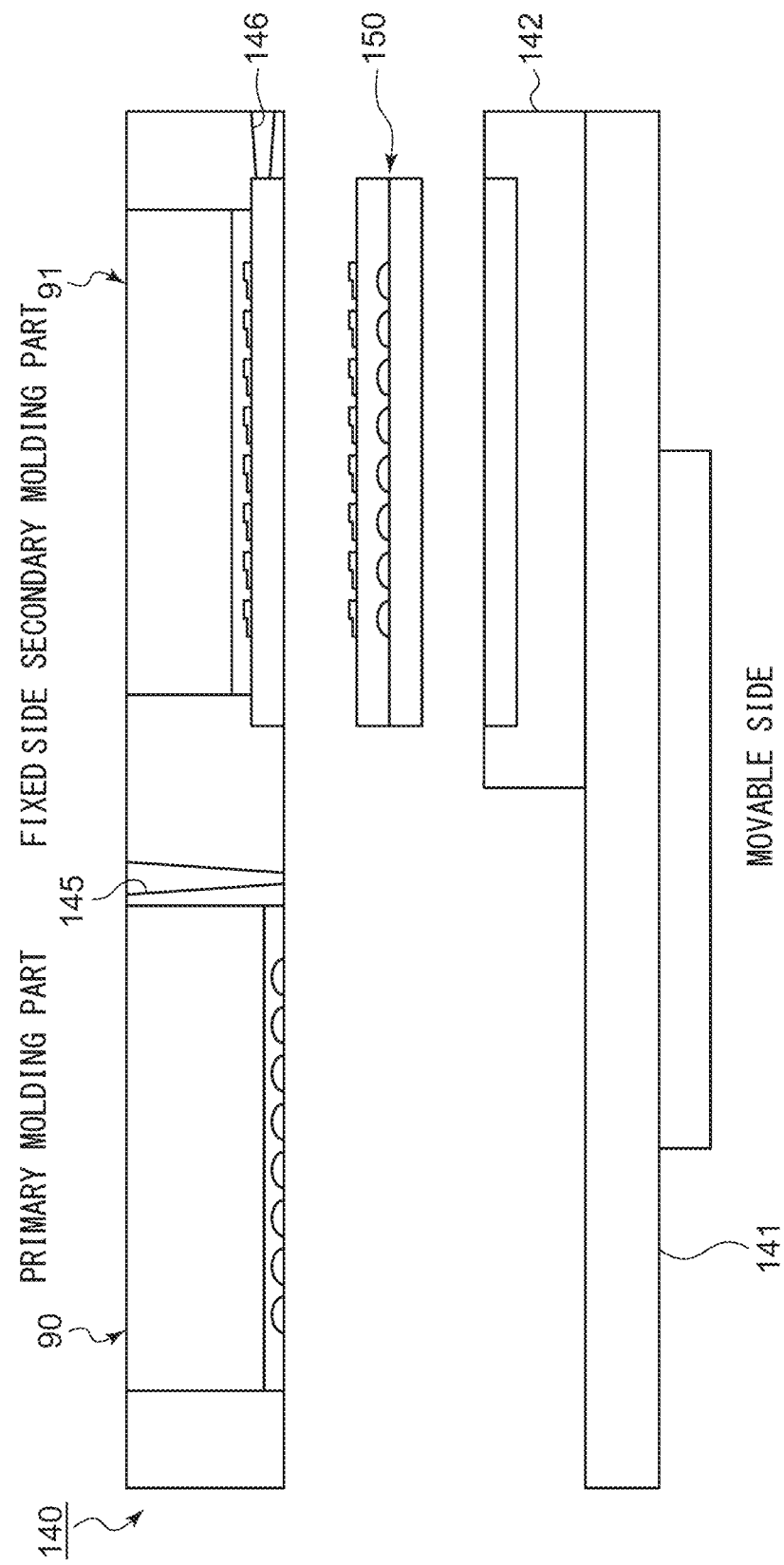
FIG. 21 shows how the molded product is retrieved.

FIG. 21 shows how the molded product is retrieved. After the mold is opened, a molded product 150 is retrieved. In this way, the optical component of the present invention is obtained.

In the above description, the method of manufacturing an optical component in which a vortex profile is formed on the first principal surface of the first layer and a lens is formed on the third principal surface of the second layer is explained. An optical component in which a lens is formed on the first principal surface of the first layer and a vortex profile is formed on the third principal surface of the second layer can be manufactured by a similar method.

Given above is an explanation based on an exemplary embodiment. The embodiment is intended to be illustrative only and it will be understood by those skilled in the art that various modifications to constituting elements and processes could be developed and that such modifications are also within the scope of the present invention.

What is claimed is:

1. An optical component comprising:
   a first layer made of a first material having a first refractive index; and
   a second layer made of a second material having a second refractive index different from the first refractive index, the first layer provided on the second layer to integrate, wherein
   a vortex lens is provided on a first boundary between the first layer and the second layer,
   the vortex lens has a spiral shape provided continuously or in steps around an optical axis of the optical component,
   the first layer has a first surface opposite to the first boundary,
   the first surface includes a first lens with a convex shape,
   the second layer has a fourth flat surface opposite to the first boundary,
   the fourth surface consist of a flat surface,
   the optical component has a phase difference represented by $\Delta\varphi = 2\pi \times mc \times \Delta n \times d/\lambda$, where d denotes a step difference in the spiral shape of the vortex lens, mc denotes a charge representing a number of repetitions in the spiral shape of the vortex lens, $\lambda$ denotes a wavelength used, and $\Delta n$ denotes a difference between the first refractive index and the second refractive index, and
   the optical component is configured to emit a collimating light with a ring-shaped light intensity distribution.

2. The optical component according to claim 1, further comprising:
   an optical device provided on the fourth surface of the second layer.

3. The optical component according to claim 2, wherein the optical device is at least one of a lens, a polarizer, a wavelength plate, a phase plate, a prism, a diffraction grating, a filter, a mirror, a half mirror, a light emitting device, and a light receiving device.

4. The optical component according to claim 1, further comprising:
   a substrate including a fifth surface and a sixth surface opposite to the fifth surface, wherein
   the second layer is provided on the substrate such that the fourth surface and the fifth surface are in contact.

5. The optical component according to claim 4, further comprising:
   an optical device provided on the sixth surface of the substrate.

6. The optical component according to claim 1, wherein combinations each including the vortex lens and the first lens are arranged in an array.

7. The optical component according to claim 1, wherein a refractive index difference between the first refractive index and the second refractive index for a wavelength 850 nm is 0.15 or greater.

8. A method of manufacturing the optical component according to claim 1, comprising:
   dropping the second material onto a mold for the second layer for molding the second layer;
   spreading the second material;
   curing the second material by irradiating the second material with light;

demolding the mold for the second layer to retrieve the second layer;

dropping the first material onto a mold for the first layer for molding the first layer;

bonding the second layer to the mold for the first layer and spreading the first material;

curing the first material by irradiating the first material with light; and demolding the mold for the first layer to retrieve a stack of the first layer and the second layer.

9. A method of manufacturing the optical component according to claim 1, comprising:

injecting the second material between the mold for the second layer for molding the second layer and a common mold;

curing the second material by cooling the second material;

opening the mold for the second layer and the common mold;

injecting the first material between the mold for the first layer for molding the first layer and the common mold in which the second layer is formed;

curing the first material by cooling the first material; and opening the mold for the first layer and the common mold and retrieving a stack of the first layer and the second layer.

10. An optical module comprising:

a light source emitting a light;

a fiber having an incident surface for receiving the light, the fiber transmitting the light;

the optical component according to claim 1, the optical component receiving the light emitted from the light source and emitting a collimating light with a ring-shaped light intensity distribution; and a second lens receiving the light emitted from the optical component and focusing the light on the incident surface of the fiber.

11. An optical module according to claim 10, a beam diameter of the light focused on the incident surface of the fiber is 10 μm to 50 μm.

12. An optical component comprising:

a first layer made of a first material having a first refractive index; and a second layer made of a second material having a second refractive index different from the first refractive index, the first layer provided on the second layer to integrate, wherein a first lens is provided on a first boundary between the first layer and the second layer, the first lens has a convex shape in the direction from the second layer to the first layer, the first layer has a first surface opposite to the first boundary, the first surface includes a vortex lens that has a spiral shape provided continuously or in steps around an optical axis of the optical component, the second layer has a fourth surface opposite to the first boundary, the fourth surface consist of a flat surface, the optical component has a phase difference represented by $\Delta\varphi=2\pi \times mc \times \Delta n \times d/\lambda$, where d denotes a step difference in the spiral shape of the vortex lens, mc denotes a charge representing a number of repetitions in the spiral shape of the vortex lens, λ denotes a wavelength used, and Δn denotes a difference between the first refractive index and the refractive index of air, and the optical component is configured to emit a collimating light with a ring-shaped light intensity distribution.

13. The optical component according to claim 12, further comprising:

an optical device provided on the fourth surface of the second layer.

14. The optical component according to claim 13, wherein the optical device is at least one of a lens, a polarizer, a wavelength plate, a phase plate, a prism, a diffraction grating, a filter, a mirror, a half mirror, a light emitting device, and a light receiving device.

15. The optical component according to claim 12, further comprising:

a substrate including a fifth surface and a sixth surface opposite to the fifth surface, wherein the second layer is provided on the substrate such that the fourth surface and the fifth surface are in contact.

16. The optical component according to claim 15, further comprising:

an optical device provided on the sixth surface of the substrate.

17. The optical component according to claim 12, wherein combinations each including the vortex lens and the first lens are arranged in an array.

18. The optical component according to claim 12, wherein a refractive index difference between the first refractive index and the second refractive index for a wavelength 850 nm is 0.15 or greater.

19. A method of manufacturing the optical component according to claim 12, comprising:

dropping the second material onto a mold for the second layer for molding the second layer;

spreading the second material;

curing the second material by irradiating the second material with light;

demolding the mold for the second layer to retrieve the second layer;

dropping the first material onto a mold for the first layer for molding the first layer;

bonding the second layer to the mold for the first layer and spreading the first material;

curing the first material by irradiating the first material with light; and demolding the mold for the first layer to retrieve a stack of the first layer and the second layer.

20. A method of manufacturing the optical component according to claim 12, comprising:

injecting the second material between the mold for the second layer for molding the second layer and a common mold;

curing the second material by cooling the second material;

opening the mold for the second layer and the common mold;

injecting the first material between the mold for the first layer for molding the first layer and the common mold in which the second layer is formed;

curing the first material by cooling the first material; and opening the mold for the first layer and the common mold and retrieving a stack of the first layer and the second layer.

\* \* \* \* \*